United States Patent
Fujita et al.

(10) Patent No.: US 7,514,128 B2
(45) Date of Patent: Apr. 7, 2009

(54) LIQUID CRYSTAL COMPOSITION AND LIQUID CRYSTAL DISPLAY DEVICE

(75) Inventors: Hiroaki Fujita, Ichihara (JP); Teru Shimada, Ichihara (JP); Norikatsu Hattori, Ichihara (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 386 days.

(21) Appl. No.: 11/378,802

(22) Filed: Mar. 16, 2006

(65) Prior Publication Data

US 2006/0210725 A1 Sep. 21, 2006

(30) Foreign Application Priority Data

Mar. 17, 2005 (JP) ............................. 2005-076953

(51) Int. Cl.
*C09K 19/30* (2006.01)
*C09K 19/12* (2006.01)
*C09K 19/20* (2006.01)

(52) U.S. Cl. .............. 428/1.3; 252/299.63; 252/299.66; 252/299.67

(58) Field of Classification Search ................... 428/1.1, 428/1.3; 252/299.63, 299.66, 299.67; 570/127, 570/129, 131
See application file for complete search history.

(56) References Cited

U.S. PATENT DOCUMENTS

| 5,384,065 A | 1/1995 | Geelhaar et al. ....... 252/299.63 |
| 6,248,410 B1 | 6/2001 | Ichinose et al. ............... 428/1.1 |
| 6,329,027 B1 * | 12/2001 | Kondo et al. .................. 428/1.1 |

FOREIGN PATENT DOCUMENTS

| EP | 0 364 538 | 5/1992 |
| EP | 0 959 060 | 11/1999 |

* cited by examiner

*Primary Examiner*—Shean C Wu
(74) *Attorney, Agent, or Firm*—J.C. Patents

(57) ABSTRACT

What are provided include a liquid crystal composition that satisfies many characteristics among the characteristics such as a wide temperature range of a nematic phase, a suitable optical anisotropy, a negatively large dielectric anisotropy, and a large specific resistance, a liquid crystal composition that satisfies the characteristics and simultaneously has a small optical anisotropy and a low minimum temperature of a nematic phase, and preferably approximately −20° C. or less, and a liquid crystal display device containing the composition. The liquid crystal composition has a negative dielectric anisotropy and contains a first component containing a liquid crystal compound containing, as one of the groups having a ring structure, a benzene ring having two hydrogens adjacent to each other replaced by fluorine and chlorine, and a second component containing a liquid crystal compound having a specific structure containing no halogen, and the liquid crystal display device contains the liquid crystal composition.

21 Claims, No Drawings

LIQUID CRYSTAL COMPOSITION AND LIQUID CRYSTAL DISPLAY DEVICE

BACKGROUND OF THE INVENTION

1. Field of the Invention

The invention relates to a liquid crystal composition and a liquid crystal display device. More specifically, the invention relates to a liquid crystal composition suitable for use in an active matrix (AM) device, and a liquid crystal display device containing the composition.

2. Related Art

A liquid crystal display device (which is a generic term for a liquid crystal display panel and a liquid crystal display module) utilizes optical anisotropy, dielectric anisotropy and so forth of a liquid crystal composition, and as an operating mode of the liquid crystal display device, such various modes have been known as a phase change (PC) mode, a twisted nematic (TN) mode, a super twisted nematic (STN) mode, a bistable twisted nematic (BTN) mode, an electrically controlled birefringence (ECB) mode, an optically compensated bend (OCB) mode, an in-plane switching (IPS) mode, a vertical alignment (VA) mode, and so forth.

In a TN mode, an STN mode and so forth, a composition having a positive dielectric anisotropy is used. In a VA mode, a composition having a negative dielectric anisotropy is used. In an IPS mode, a composition having a positive or negative dielectric anisotropy is used. An ECB mode, an IPS mode, a VA mode and so forth using a composition having a negative dielectric anisotropy among these operation modes are such an operation mode that utilizes the fact that liquid crystal molecules are oriented perpendicular to the electric field, and in particular an IPS mode and a VA mode are such a mode that utilizes electrically controlled birefringence (ECB) and have been known as being capable of improving a narrow viewing angle, which is a defect of the conventional operation mode, such as a TN mode and an STN mode.

Various compositions have been investigated that contain, as a liquid crystal compound having a negative dielectric anisotropy capable of being used in a liquid crystal display device of these operation modes, such a liquid crystal compound that hydrogen on a benzene ring is replaced by fluorine (see, for example, JP H02-503441 A/ 1990)

The liquid crystal compound is a generic term for a compound having a liquid crystal phase such as a nematic phase, a smectic phase and so forth, and also for a compound having no liquid crystal phase but being useful as a component of a composition. The content ratio of the component is calculated based on the total weight of the liquid crystal composition. The liquid crystal compound herein is a compound represented by formula (A). The compound may be an optically active compound:

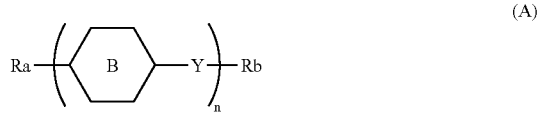

(A)

In formula (A), Ra and Rb are independently are hydrogen, alkyl, alkoxy, alkoxyalkyl, alkoxyalkoxy, acyloxy, acyloxyalkyl, alkoxycarbonyl, alkoxycarbonylalkyl, alkenyl, alkenyloxy, alkenyloxyalkyl, alkoxyalkenyl, alkynyl, alkynyloxy, cyano, —NCS, fluorine or chlorine. These groups have 10 or less carbons. In the group having 1 to 5 carbons, arbitrary hydrogen may be replaced by fluorine or chlorine, and the total number of the replaced fluorine and chlorine is 1 to 11.

In formula (A), ring B is 1,4-cyclohexylene, 1,4-phenylene, pyrane-2,5-diyl, 1,3-dioxane-2,5-diyl, pyridine-2,5-diyl, pyrimidine-2,5-diyl, decahydronaphthalene-2,6-diyl, 1,2,3,4-tetrahydronaphthalene-2,6-diyl or naphthalene-2,6-diyl. In ring B, arbitrary hydrogen may be replaced by fluorine or chlorine. In ring B, the total number of the replaced fluorine and chlorine is 1 to 4. In the 1,4-phenylene, arbitrary one or two hydrogens may be replaced by cyano, methyl, difluoromethyl or trifluoromethyl.

In formula (A), Y represents a single bond, —(CH$_2$)$_2$—, —COO—, —OCO—, —CH$_2$O—, —OCH$_2$—, —CF$_2$O—, —OCF$_2$—, —CH═CH—, —CF═CF—, —(CH$_2$)$_4$—, —(CH$_2$)$_3$—O—, —O—(CH$_2$)$_3$—, —CH═CH—(CH$_2$)$_2$—, —(CH$_2$)$_2$—CH═CH—, —(CH$_2$)$_2$CF$_2$O—, —OCF$_2$(CH$_2$)$_2$—, —(CH$_2$)$_2$COO—, —(CH$_2$)$_2$OCO—, —COO(CH$_2$)$_2$—, —OCO(CH$_2$)$_2$—, —CH═CH—COO—, —CH═CH—OCO—, —COO—CH═CH— or —OCO—CH═CH—.

In formula (A), n represents 1, 2, 3 or 4.

However, the compound having a hydrogen on a benzene ring replaced by fluorine exemplified in JP H02-503441 A/1990 is poor in compatibility with other liquid crystal compounds in a low temperature range, and in the case where a liquid crystal composition is formed with the compound, the composition cannot be used in a low temperature range in some cases.

A liquid crystal composition containing a compound having 2,3-difluorophenylene has been disclosed (see, for example, JP H10-251644 A/1998). However, a liquid crystal composition containing a compound having 2,3-difluorophenylene cannot have a small optical anisotropy (Δn) (for example, 0.07 or less) in some cases. Furthermore, JP H10-251644 A/1998 contains no disclosure relating to a minimum temperature of a nematic phase of the liquid crystal composition.

EP 0 474 062 A2 (U.S. Pat. No. 5,384,065) discloses a compound having 2,3-difluorophenylene in the structure thereof as a compound suitable for a liquid crystal display device, but contains no disclosure of the liquid crystal compound having the specific structure as a component of the invention, in which hydrogen on a benzene ring is replaced by chlorine and fluorine.

A composition containing a liquid crystal compound having a specific structure, in which hydrogen on a benzene ring is replaced by chlorine and fluorine, has been disclosed (see, for example, International Publication 98/23561/1998 (U.S. Pat. No. 6,329,027). However, a composition containing the compound does not have a high clear point and has a large viscosity.

A liquid crystal display device having such an operation mode as an IPS mode and a VA mode still has a problem as a display device in comparison to a CRT, and the characteristics thereof are demanded for improvement.

The liquid crystal display device driven in an IPS mode or a VA mode is constituted mainly by a liquid crystal composition having a negative dielectric anisotropy, and in order to improve further the characteristics, the liquid crystal composition is demanded to have the following characteristics (1) to (5), i.e., (1) a wide temperature range of a nematic phase, (2) a low viscosity, (3) a suitable optical anisotropy, (4) a large absolute value of dielectric anisotropy, and (5) a large specific resistance.

The temperature range of a nematic phase relates to a temperature range where the liquid crystal display device is used, and a liquid crystal display device containing a liquid crystal composition having a wide temperature range of a nematic phase as in the item (1) has a wide temperature range where the liquid crystal display device can be used.

A liquid crystal display device containing a liquid crystal composition having a small viscosity as in the item (2) has a short response time. A liquid crystal display device having a short response time can be favorably used for displaying a moving image. Furthermore, upon injecting the liquid crystal composition into a liquid crystal cell of the liquid crystal display device, the injection time can be reduced to improve the workability.

A liquid crystal display device containing a liquid crystal composition having a suitable optical anisotropy as in the item (3) has a large contrast.

A liquid crystal display device containing a liquid crystal composition having a large absolute value of dielectric anisotropy as in the item (4) reduces a threshold voltage, decreases a driving voltage, and reduces an electric power consumption.

A liquid crystal display device containing a liquid crystal composition having a large specific resistance as in the item (5) increases a voltage holding ratio and increases a contrast ratio. Therefore, such a liquid crystal composition is preferred that has a large specific resistance in the initial stage and has a large specific resistance even after using for a long period of time.

SUMMARY OF THE INVENTION

The invention concerns a liquid crystal composition having a negative dielectric anisotropy and containing a first component containing at least one compound selected from a group of compounds represented by formulas (1-1) and (1-2) and a second component containing at least one compound selected from a group of compounds represented by formulas (2-1) and (2-2):

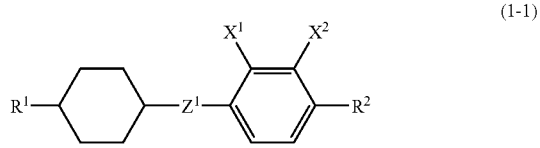

(1-1)

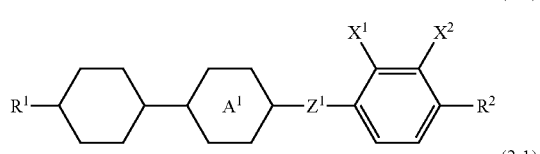

(1-2)

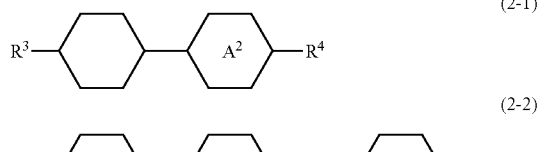

(2-1)

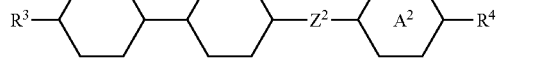

(2-2)

wherein, independently in each formula, $R^1$ is alkyl having 1 to 8 carbons or alkenyl having 2 to 8 carbons;

$R^2$ is alkyl having 1 to 8 carbons or alkoxy having 1 to 7 carbons;

$R^3$ is alkyl having 1 to 8 carbons or alkenyl having 2 to 8 carbons;

$R^4$ is alkyl having 1 to 8 carbons, alkenyl having 2 to 8 carbons or alkoxy having 1 to 7 carbons;

$Z^1$ is a single bond, —$C_2H_4$— or —$CH_2O$—;

$Z^2$ is a single bond, —$C_2H_4$—, —$CH_2O$— or —COO—;

ring $A^1$ and ring $A^2$ are independently 1,4-cyclohexylene or 1,4-phenylene; and one of $X^1$ and $X^2$ is fluorine, and the other is chlorine.

The invention also includes a liquid crystal display device containing the liquid crystal composition.

DETAILED DESCRIPTION

An advantage of the invention is to provide a liquid crystal composition that satisfies many characteristics among the characteristics such as a wide temperature range of a nematic phase, a suitable optical anisotropy, a negatively large dielectric anisotropy, and a large specific resistance, and in particular, a liquid crystal composition that satisfies the characteristics and simultaneously has a small optical anisotropy and a low minimum temperature of a nematic phase, and preferably approximately −20° C. or less. Another advantage of the invention is to provide a liquid crystal display device containing the composition, and the liquid crystal display device has a large voltage holding ratio and is driven by an active matrix (AM) mode suitable for a VA mode, an IPS mode and so forth.

As a result of earnest investigations made by the inventors in view of the problems associated with the conventional techniques, it has been found that a liquid crystal composition containing a liquid crystal compound having a specific structure, in which two hydrogens adjacent to each other on a benzene ring are replaced by chlorine and fluorine, and another liquid crystal compound having a specific structure has a wide temperature range of a nematic phase, a suitable optical anisotropy, a negatively large dielectric anisotropy, and a large specific resistance, and a liquid crystal display device containing the composition has a large voltage holding ratio. Thus, the invention has been completed.

The present invention has the following.

1. A liquid crystal composition having a negative dielectric anisotropy and comprising a first component comprising at least one compound selected from a group of compounds represented by formulas (1-1) and (1-2) and a second component comprising at least one compound selected from a group of compounds represented by formulas (2-1) and (2-2):

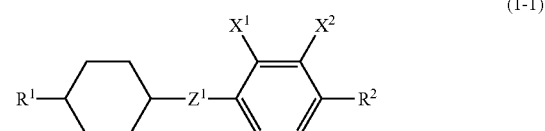

(1-1)

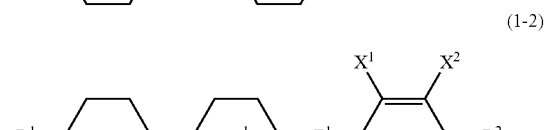

(1-2)

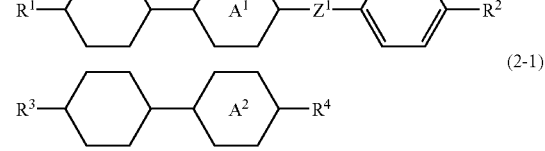

(2-1)

-continued (2-2)
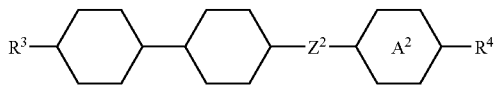

wherein, independently in each formula, $R^1$ is alkyl having 1 to 8 carbons or alkenyl having 2 to 8 carbons;

$R^2$ is alkyl having 1 to 8 carbons or alkoxy having 1 to 7 carbons;

$R^3$ is alkyl having 1 to 8 carbons or alkenyl having 2 to 8 carbons;

$R^4$ is alkyl having 1 to 8 carbons, alkenyl having 2 to 8 carbons or alkoxy having 1 to 7 carbons;

$Z^1$ is a single bond, —$C_2H_4$— or —$CH_2O$—;

$Z^2$ is a single bond, —$C_2H_4$—, —$CH_2O$— or —COO—;

ring $A^1$ and ring $A^2$ are independently 1,4-cyclohexylene or 1,4-phenylene; and one of $X^1$ and $X^2$ is fluorine, and the other is chlorine.

2. The liquid crystal composition according to item 1, wherein the first component comprises at least one compound selected from a group of compounds represented by formula (1-1).

3. The liquid crystal composition according to item 1, wherein the first component comprises at least one compound selected from a group of compounds represented by formula (1-2).

4. The liquid crystal composition according to item 1, wherein the first component comprises at least one compound selected from a group of compounds represented by formula (1-1) and at least one compound selected from a group of compounds represented by formula (1-2).

5. The liquid crystal composition according to item 1, wherein a content ratio of the first component is from approximately 20% to approximately 90% by weight, and a content ratio of the second component is from approximately 10% to approximately 80% by weight, based on the total weight of the liquid crystal compounds.

6. A liquid crystal composition having a negative dielectric anisotropy and comprising a first component comprising at least one compound selected from a group of compounds represented by formulas (1-1-1) to (1-1-6) and (1-2-1) to (1-2-12) and a second component comprising at least one compound selected from a group of compounds represented by formulas (2-1-1), (2-1-2) and (2-2-1):

(1-1-1)
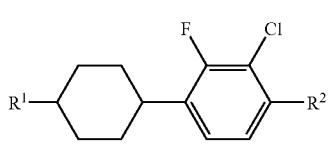

(1-1-2)
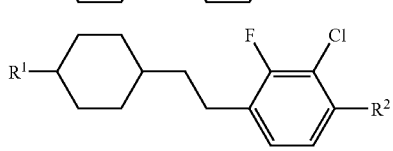

(1-1-3)
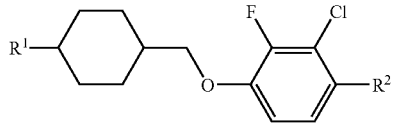

(1-1-4)
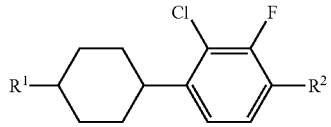

(1-1-5)
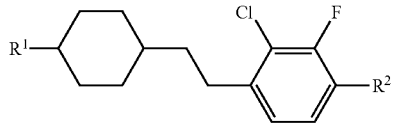

(1-1-6)
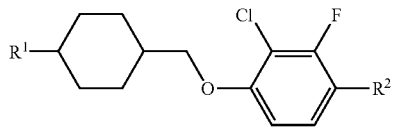

(1-2-1)
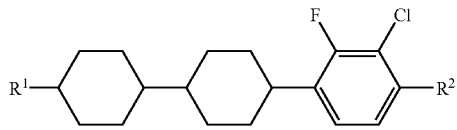

(1-2-2)
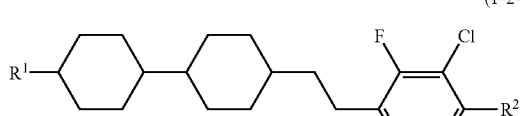

(1-2-3)
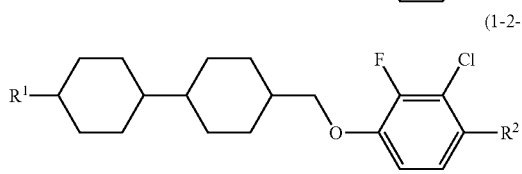

(1-2-4)
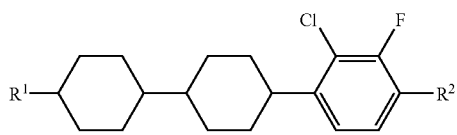

(1-2-5)
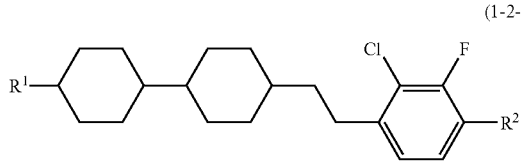

(1-2-6)
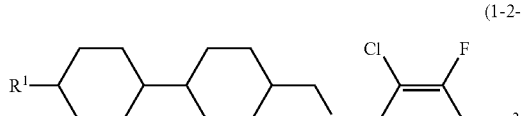

(1-2-7)
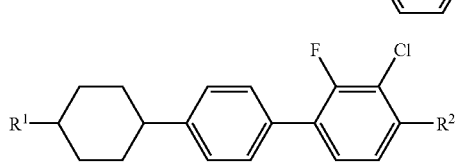

-continued

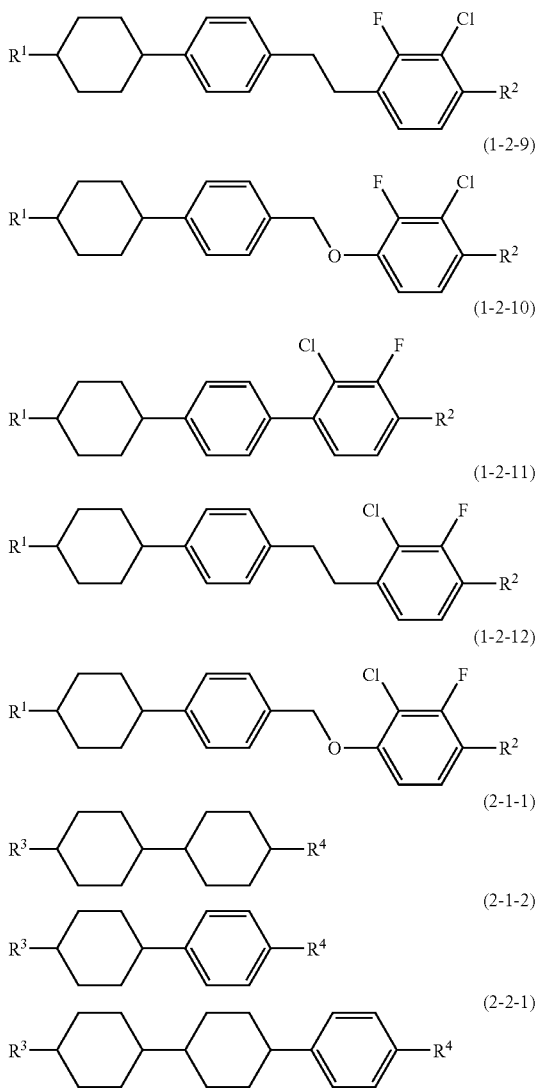

wherein, independently in each formula, $R^1$ is alkyl having 1 to 8 carbons or alkenyl having 2 to 8 carbons;

$R^2$ is alkyl having 1 to 8 carbons or alkoxy having 1 to 7 carbons;

$R^3$ is alkyl having 1 to 8 carbons or alkenyl having 2 to 8 carbons; and $R^4$ is alkyl having 1 to 8 carbons, alkenyl having 2 to 8 carbons or alkoxy having 1 to 7 carbons.

7. The liquid crystal composition according to item 6, wherein the first component comprises at least one compound selected from a group of compounds represented by formulas (1-1-1) to (1-1-6).

8. The liquid crystal composition according to item 6, wherein the first component comprises at least one compound selected from a group of compounds represented by formulas (1-2-1) to (1-2-12).

9. The liquid crystal composition according to item 6, wherein the first component comprises at least one compound selected from a group of compounds represented by formulas (1-1-1) to (1-1-6) and at least one compound selected from a group of compounds represented by formulas (1-2-1) to (1-2-12).

10. The liquid crystal composition according to item 6, wherein the first component comprises at least one compound selected from a group of compounds represented by formulas (1-1-1) to (1-1-6) and (1-2-1) to (1-2-6).

11. The liquid crystal composition according to item 6, wherein the first component comprises at least one compound selected from a group of compounds represented by formulas (1-1-1) to (1-1-3), (1-2-1) to (1-2-3) and (1-2-7) to (1-2-9).

12. The liquid crystal composition according to item 6, wherein the first component comprises at least one compound selected from a group of compounds represented by formulas (1-1-4) to (1-1-6), (1-2-4) to (1-2-6) and (1-2-10) to (1-2-12).

13. The liquid crystal composition according to item 6, wherein the first component comprises at least one compound selected from a group of compounds represented by formulas (1-1-1), (1-1-4), (1-2-1) and (1-2-4).

14. The liquid crystal composition according to item 6, wherein the first component comprises at least one compound selected from a group of compounds represented by formulas (1-1-2), (1-1-5), (1-2-2) and (1-2-5).

15. The liquid crystal composition according to item 6, wherein the first component comprises at least one compound selected from a group of compounds represented by formulas (1-1-3), (1-1-6), (1-2-3) and (1-2-6).

16. The liquid crystal composition according to any one of items 1 to 15, wherein a content ratio of the first component is from approximately 20% to approximately 90% by weight, and a content ratio of the second component is from approximately 10% to approximately 80% by weight, based on the total weight of the liquid crystal compounds.

17. The liquid crystal composition according to any one of items 1 to 15, wherein a content ratio of the first component is from approximately 40% to approximately 85% by weight, and a content ratio of the second component is from approximately 15% to approximately 60% by weight, based on the total weight of the liquid crystal compounds.

18. A liquid crystal composition having a negative dielectric anisotropy and comprising a first component comprising at least one compound selected from a group of compounds represented by formulas (1-1) and (1-2), a second component comprising at least one compound selected from a group of compounds represented by formulas (2-1) and (2-2), and a third component comprising at least one compound selected from a group of compounds represented by formulas (3-1) and (3-2):

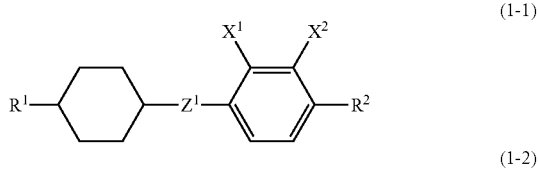

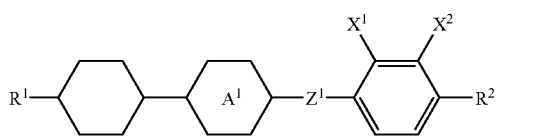

-continued (2-1)

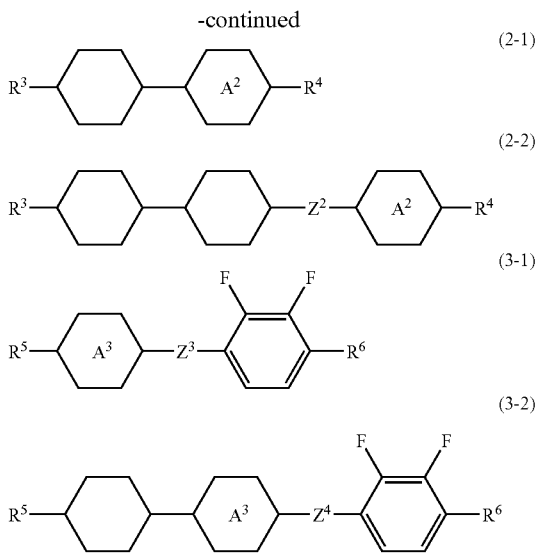

(2-2)

(3-1)

(3-2)

wherein, independently in each formula, $R^1$ is alkyl having 1 to 8 carbons or alkenyl having 2 to 8 carbons;

$R^2$ is alkyl having 1 to 8 carbons or alkoxy having 1 to 7 carbons;

$R^3$ is alkyl having 1 to 8 carbons or alkenyl having 2 to 8 carbons;

$R^4$ is alkyl having 1 to 8 carbons, alkenyl having 2 to 8 carbons or alkoxy having 1 to 7 carbons;

$Z^1$ is a single bond, —$C_2H_4$— or —$CH_2O$—;

$Z^2$ is a single bond, —$C_2H_4$—, —$CH_2O$— or —COO—;

ring $A^1$ and ring $A^2$ are independently 1,4-cyclohexylene or 1,4-phenylene;

one of $X^1$ and $X^2$ is fluorine, and the other is chlorine;

$R^5$ is alkyl having 1 to 8 carbons or alkenyl having 2 to 8 carbons;

$R^6$ is alkyl having 1 to 8 carbons or alkoxy having 1 to 7 carbons;

$Z^3$ is a single bond, —$C_2H_4$—, —$OCF_2$—, —$OCF_2C_2H_4$— or —$C_2H_4COO$—;

$Z^4$ is a single bond, —$C_2H_4$—, —$OCF_2$— or —$OCF_2C_2H_4$—; and

Ring $A^3$ is 1,4-cyclohexylene or 1,4-phenylene.

19. The liquid crystal composition according to item 18, wherein the third component comprises at least one compound selected from a group of compounds represented by formulas (3-1-1), (3-2-1) and (3-2-2):

(3-1-1)

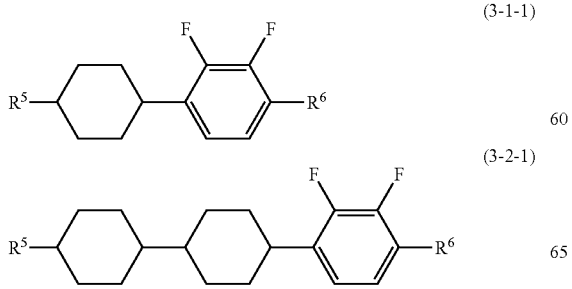

(3-2-1)

(3-2-2)

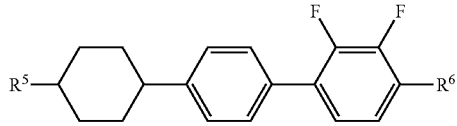

$R^5$ is alkyl having 1 to 8 carbons or alkenyl having 2 to 8 carbons; and $R^6$ is alkyl having 1 to 8 carbons or alkoxy having 1 to 7 carbons.

20. The liquid crystal composition according to item 19, wherein the first component comprises at least one compound selected from a group of compounds represented by formulas (1-1-1) to (1-1-6), the second component comprising at least one compound selected from a group of compounds represented by formulas (2-1-1), (2-1-2) and (2-2-1), and the third component comprising at least one compound selected from a group of compounds represented by formulas (3-1-1) and (3-2-1).

21. The liquid crystal composition according to item 19, wherein the first component comprises at least one compound selected from a group of compounds represented by formulas (1-2-1) to (1-2-12), the second component comprising at least one compound selected from a group of compounds represented by formulas (2-1-1), (2-1-2) and (2-2-1), and the third component comprising at least one compound selected from a group of compounds represented by formulas (3-1-1) and (3-2-1).

22. A liquid crystal composition having a negative dielectric anisotropy and comprising a first component comprising at least one compound selected from a group of compounds represented by formulas (1-1-1) to (1-1-6) and at least one compound selected from a group of compounds represented by formulas (1-2-1) to (1-2-12), a second component comprising at least one compound selected from a group of compounds represented by formulas (2-1-1), (2-1-2) and (2-2-1), and a third component comprising at least one compound selected from a group of compounds represented by formulas (3-1-1) and (3-2-1):

(1-1-1)

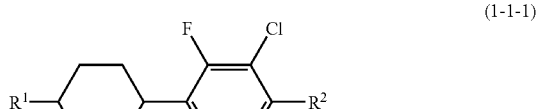

(1-1-2)

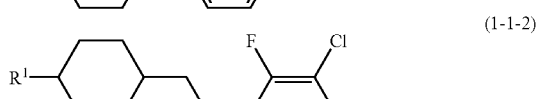

(1-1-3)

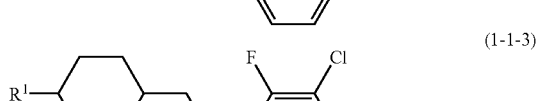

(1-1-4)

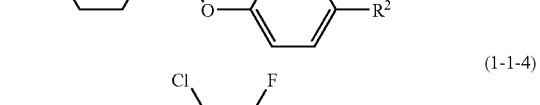

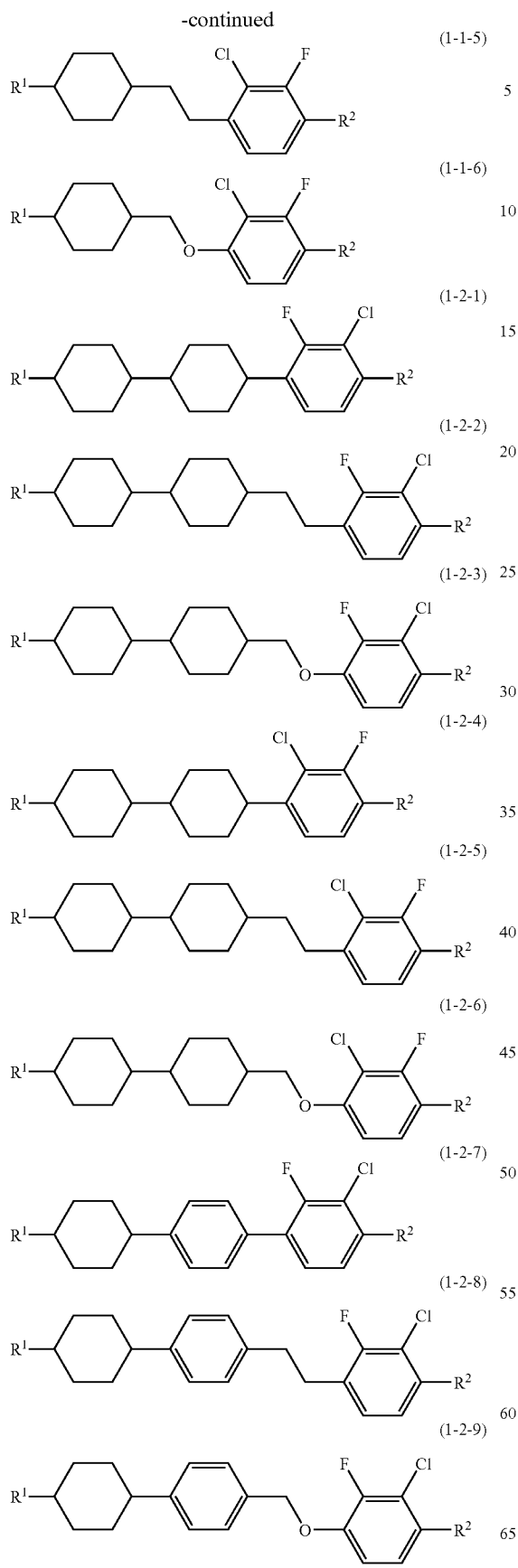
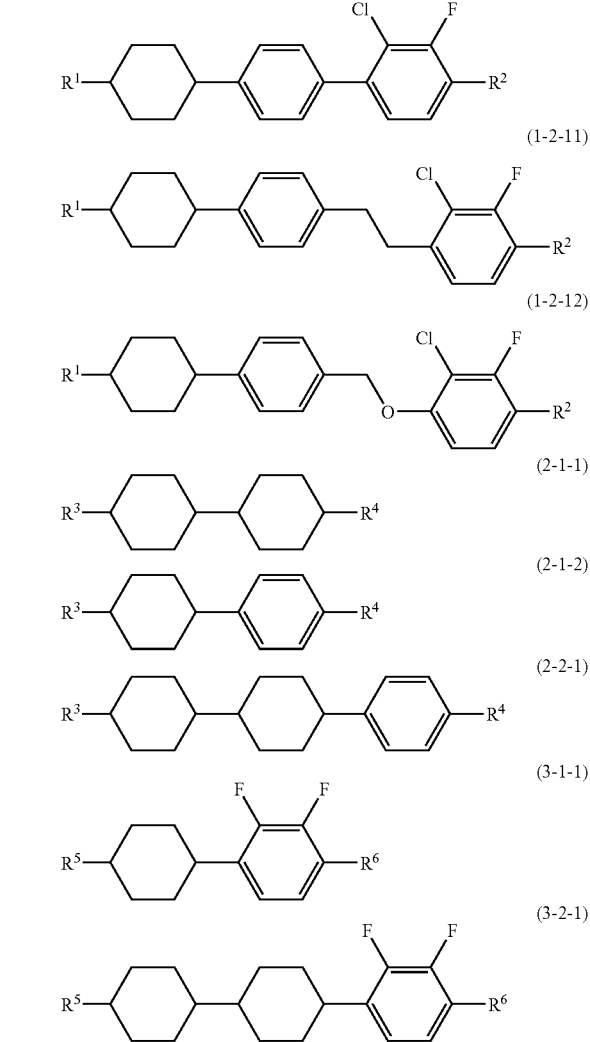

wherein, independently in each formula,

R¹ is alkyl having 1 to 8 carbons or alkenyl having 2 to 8 carbons;

R² is alkyl having 1 to 8 carbons or alkoxy having 1 to 7 carbons;

R³ is alkyl having 1 to 8 carbons or alkenyl having 2 to 8 carbons;

R⁴ is alkyl having 1 to 8 carbons, alkenyl having 2 to 8 carbons or alkoxy having 1 to 7 carbons;

R⁵ is alkyl having 1 to 8 carbons or alkenyl having 2 to 8 carbons; and

R⁶ is alkyl having 1 to 8 carbons or alkoxy having 1 to 7 carbons.

23. A liquid crystal composition having a negative dielectric anisotropy and comprising a first component comprising at least one compound selected from a group of compounds represented by formulas (1-1-1) to (1-1-6) and (1-2-1) to (1-2-6), a second component comprising at least one compound selected from a group of compounds represented by formulas (2-1-1), (2-1-2) and (2-2-1), and a third component comprising at least one compound selected from a group of compounds represented by formulas (3-1-1) and (3-2-1):

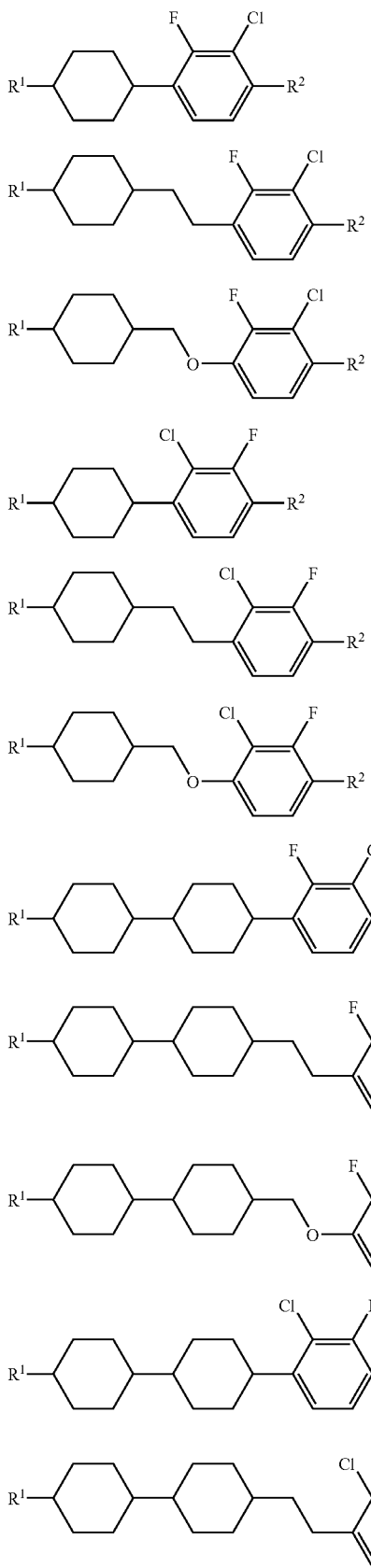
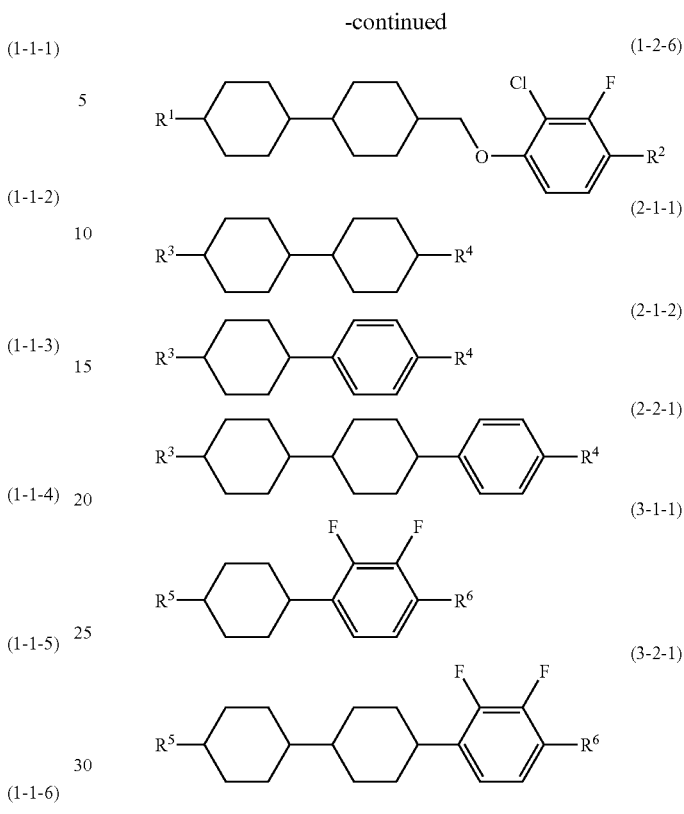

wherein, independently in each formula,

R¹ is alkyl having 1 to 8 carbons or alkenyl having 2 to 8 carbons;

R² is alkyl having 1 to 8 carbons or alkoxy having 1 to 7 carbons;

R³ is alkyl having 1 to 8 carbons or alkenyl having 2 to 8 carbons;

R⁴ is alkyl having 1 to 8 carbons, alkenyl having 2 to 8 carbons or alkoxy having 1 to 7 carbons;

R⁵ is alkyl having 1 to 8 carbons or alkenyl having 2 to 8 carbons; and

R⁶ is alkyl having 1 to 8 carbons or alkoxy having 1 to 7 carbons.

24. The liquid crystal composition according to item 23, wherein the first component comprises at least one compound selected from a group of compounds represented by formulas (1-1-1) to (1-1-3) and (1-2-1) to (1-2-3), the second component comprising at least one compound selected from a group of compounds represented by formulas (2-1-1), (2-1-2) and (2-2-1), and the third component comprising at least one compound selected from a group of compounds represented by formulas (3-1-1) and (3-2-1).

25. The liquid crystal composition according to item 23, wherein the first component comprises at least one compound selected from a group of compounds represented by formulas (1-1-4) to (1-1-6) and (1-2-4) to (1-2-6), the second component comprising at least one compound selected from a group of compounds represented by formulas (2-1-1), (2-1-2) and (2-2-1), and the third component comprising at least one compound selected from a group of compounds represented by formulas (3-1-1) and (3-2-1).

26. The liquid crystal composition according to any one of items 18 to 25, wherein a content ratio of the first component is from approximately 10% to approximately 80% by weight, a content ratio of the second component is from approximately 10% to approximately 80% by weight, and a content ratio of the third component is from approximately 10% to approximately 80% by weight, based on the total weight of the liquid crystal compounds.

27. The liquid crystal composition according to any one of items 18 to 25, wherein a content ratio of the first component is from approximately 30% to approximately 70% by weight, a content ratio of the second component is from approximately 10% to approximately 50% by weight, and a content ratio of the third component is from approximately 20% to approximately 60% by weight, based on the total weight of the liquid crystal compounds.

28. The liquid crystal composition according to any one of items 1 to 27, wherein the liquid crystal composition has a dielectric anisotropy of from approximately −5.0 to approximately −2.0.

29. A liquid crystal display device comprising the liquid crystal composition according to any one of items 1 to 28.

The liquid crystal composition of the invention contains the first component containing a liquid crystal compound having a specific structure, in which hydrogens on a benzene ring are replaced by chlorine and fluorine, and the second component containing another liquid crystal compound, and also contains, depending on necessity, a third component containing a specific structure, in which two hydrogens on a benzene ring are replaced by fluorine.

With respect to the first to third components, the structures of the compounds used in the components, the characteristics and effects of the components, and specific examples and preferred examples of the components are described below.

First Component

The compound as the first component of the liquid crystal composition of the invention is a liquid crystal compound represented by formula (1-1) or (1-2):

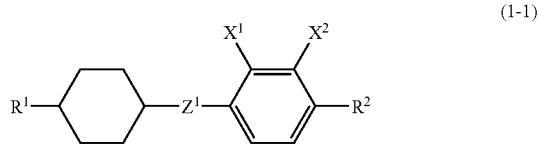

(1-1)

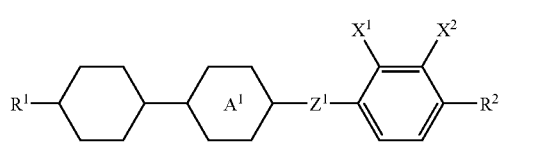

(1-2)

In the formulas, independently, $R^1$, $R^2$, $X^1$, $X^2$ and $Z^1$ are defined as follows.

$R^1$ is alkyl having 1 to 8 carbons or alkenyl having 2 to 8 carbons. In the alkyl and alkenyl, linear alkyl and alkenyl having a linear alkyl chain, specifically, methyl, ethyl, propyl, butyl, pentyl, hexyl, heptyl and octyl, and vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl and 5-hexenyl are preferred, and ethyl, propyl, butyl, pentyl and heptyl, and vinyl, 1-propenyl, 3-butenyl and 3-pentenyl are more preferred.

$R^2$ is alkyl having 1 to 8 carbons or alkoxy having 1 to 7 carbons. In the alkyl and alkoxy, linear alkyl and alkoxy having a linear alkyl chain, specifically, methyl, ethyl, propyl, butyl, pentyl, hexyl, heptyl and octyl, and methoxy, ethoxy, propoxy, butoxy, pentyloxy, hexyloxy and heptyloxy are preferred, and methoxy, ethoxy, propoxy and butoxy are more preferred.

One of $X^1$ and $X^2$ is fluorine, and the other is chlorine.

$Z^1$ is a single bond, $—C_2H_4—$ or $—CH_2O—$.

Ring $A^1$ is 1,4-cyclohexylene or 1,4-phenylene.

In the case where the ring contained in the compound represented by formula (1-1) or (1-2) is 1,4-cyclohexylene, the steric configuration thereof is preferably a trans configuration.

One of the characteristic features of the compound represented by formula (1-1) or (1-2) resides in that the structure contains, as one of the groups having a ring structure, a benzene ring having two hydrogens adjacent to each other replaced by fluorine and chlorine, and also contains, as an end group, alkyl or alkoxy. Owing to the liquid crystal compound as the first component having the structure, the liquid crystal composition of the invention can have a negatively large dielectric anisotropy and a low minimum temperature of a nematic phase.

The liquid crystal compound represented by formula (1-1) (hereinafter, sometimes referred to as a compound (1-1)) among the compounds has such a maximum temperature of a nematic phase that is not necessarily high as compared to an ordinary liquid crystal compound, but has such characteristics as a large specific resistance, a moderate viscosity and a moderate optical anisotropy.

The liquid crystal compound represented by formula (1-2) (hereinafter, sometimes referred to as a compound (1-2)) among the compounds has such a viscosity that is not necessarily low as compared to an ordinary liquid crystal compound, but has such characteristics as a large specific resistance, a high maximum temperature of a nematic phase and a moderate or relatively large optical anisotropy.

Among the liquid crystal compounds (1-1) and (1-2), compounds represented by formulas (1-1-1) to (1-1-6) and (1-2-1) to (1-2-12) are preferred:

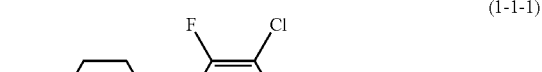

(1-1-1)

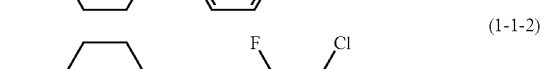

(1-1-2)

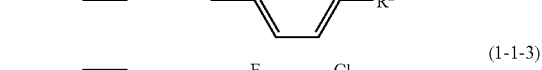

(1-1-3)

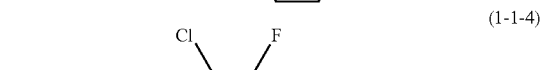

(1-1-4)

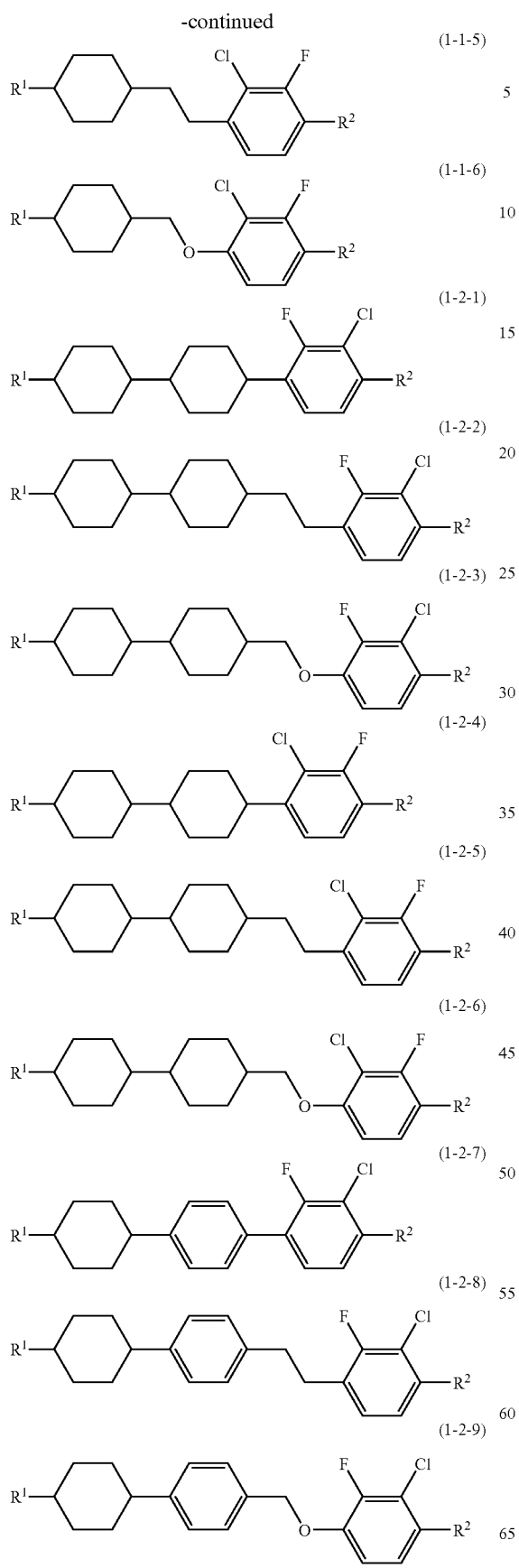

In the formulas, $R^1$ and $R^2$ have the same meanings as in the compounds (1-1) and (1-2). The steric configuration of 1,4-cyclohexylene contained in the compounds is preferably a trans configuration. Compound wherein $R^2$ is independently alkoxy are preferred.

In the case where the liquid crystal compound as the first component of the liquid crystal composition of the invention is a compound represented by the aforementioned formulas, the liquid crystal composition can have a negatively large dielectric anisotropy and can have a low minimum temperature of a nematic phase.

In the case where the liquid crystal compound as the first component of the liquid crystal composition of the invention is a liquid crystal compound represented by formulas (1-1-1) to (1-1-6), furthermore, the maximum temperature of the nematic phase can be adjusted to be low, and the minimum temperature of a nematic phase can be further low.

In the case where the liquid crystal compound as the first component of the liquid crystal composition of the invention is a liquid crystal compound represented by formulas (1-2-1) to (1-2-12), furthermore, the maximum temperature of the nematic phase can be high.

In the case where the liquid crystal compound as the first component of the liquid crystal composition of the invention is a liquid crystal compound represented by formulas (1-1-1) to (1-1-6) and (1-2-1) to (1-2-6), furthermore, the optical anisotropy can be small.

In the case where the liquid crystal compound as the first component of the liquid crystal composition of the invention is a liquid crystal compound represented by formulas (1-1-1) to (1-1-3), (1-2-1) to (1-2-3), and (1-2-7) to (1-2-9), furthermore, the optical anisotropy can be large in some cases.

In the case where the liquid crystal compound as the first component of the liquid crystal composition of the invention is a liquid crystal compound represented by formulas (1-1-4) to (1-1-6), (1-2-4) to (1-2-6), and (1-2-10) to (1-2-12), furthermore, the optical anisotropy can be small in some cases.

In the case where the liquid crystal compound as the first component of the liquid crystal composition of the invention is a liquid crystal compound represented by formulas (1-1-1), (1-1-4), (1-2-1) and (1-2-4), furthermore, the maximum temperature of a nematic phase can be high, and the dielectric anisotropy can be negatively large, in some cases. In addition to these characteristics, the optical anisotropy can be small in some cases.

In the case where the liquid crystal compound as the first component of the liquid crystal composition of the invention is a liquid crystal compound represented by formulas (1-1-2), (1-1-5), (1-2-2) and (1-2-5), furthermore, the optical anisotropy can be small, and the minimum temperature of a nematic phase can be low.

In the case where the liquid crystal compound as the first component of the liquid crystal composition of the invention is a liquid crystal compound represented by formulas (1-1-3), (1-1-6), (1-2-3) and (1-2-6), furthermore, the dielectric anisotropy can be negatively large, and the optical anisotropy can be small.

Among the compounds represented by formulas (1-1-1) to (1-1-6) and (1-2-1) to (1-2-12), liquid crystal compounds represented by formulas (1-2-1) to (1-2-6) are more preferred.

In the case where the liquid crystal compound as the first component of the liquid crystal composition of the invention is a compound represented by the aforementioned formulas, the liquid crystal composition can have a negatively large dielectric anisotropy, a high maximum temperature of a nematic phase, a suitable optical anisotropy, and a low minimum temperature of a nematic phase. In the case where $R^2$ is alkoxy, in particular, the dielectric anisotropy can be negatively large.

The first component used in the liquid crystal composition of the invention may be a sole compound represented by formula (1-1) wherein $X^1$ is chlorine and $X^2$ is fluorine. The first component may be plural compounds wherein $X^1$ is chlorine and $X^2$ is fluorine. The first component may be a sole compound represented by formula (1-1) wherein $X^1$ is fluorine and $X^2$ is chlorine. The first component may be plural compounds wherein $X^1$ is fluorine and $X^2$ is chlorine. The first component may be a mixture of a compound $X^1$ is chlorine and $X^2$ is fluorine and a compound wherein $X^1$ is fluorine and $X^2$ is chlorine. In this case, the liquid crystal composition has a decreased minimum temperature of a nematic phase in some cases. The situations are the same as for formula (1-2). Furthermore, the first component may be a mixture of the compound (1-1) and the compound (1-2).

Second Component

The compound as the second component of the liquid crystal composition of the invention is a liquid crystal compound represented by formula (2-1) or (2-2):

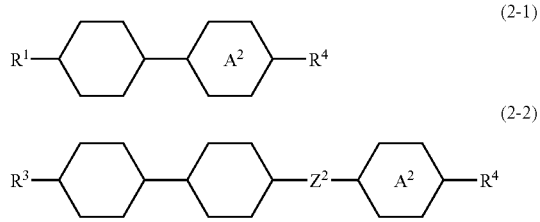

(2-1)

(2-2)

In the formulas, independently, $R^3$, $R^4$ and $A^2$ are defined as follows.

$R^3$ is alkyl having 1 to 8 carbons or alkenyl having 2 to 8 carbons. In the alkyl and alkenyl, linear alkyl and alkenyl having a linear alkyl chain, specifically, methyl, ethyl, propyl, butyl, pentyl, hexyl, heptyl and octyl, and vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl and 5-hexenyl are preferred, and ethyl, propyl, butyl, pentyl and heptyl, and vinyl, 1-propenyl, 3-butenyl and 3-pentenyl are more preferred.

In the case where $R^3$ is alkenyl, the steric configuration of —CH═CH— depends on the position of the double bond.

In the case where $R^3$ is 1-propenyl, 1-butenyl, 1-pentenyl, 1-hexenyl, 3-pentenyl or 3-hexenyl, a trans configuration is preferred. In the case where $R^3$ is 2-butenyl, 2-pentenyl, 2-hexenyl or 4-hexenyl, a cis configuration is preferred.

$R^4$ is alkyl having 1 to 8 carbons, alkenyl having 2 to 8 carbons or alkoxy having 1 to 7 carbons. In the alkyl, alkenyl and alkoxy, linear alkyl, alkenyl having a linear alkyl chain and alkoxy having a linear alkyl chain, specifically, methyl, ethyl, propyl, butyl, pentyl, hexyl, heptyl and octyl, vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl and 5-hexenyl, and methoxy, ethoxy, propoxy, butoxy, pentyloxy, hexyloxy and heptyloxy are preferred, and ethyl, propyl, butyl, pentyl and vinyl, 1-propenyl, 3-butenyl and 3-pentenyl, and methoxy, ethoxy, propoxy and butoxy are more preferred.

The preferred steric configuration of $R^4$ when $R^4$ is alkenyl is the same as in $R^3$.

Ring $A^2$ is 1,4-cyclohexylene or 1,4-phenylene.

$Z^2$ is a single bond, —$C_2H_4$—, —$CH_2O$— or —COO—.

In the case where the ring contained in the compound represented by formula (2-1) or (2-2) is 1,4-cyclohexylene, the steric configuration thereof is preferably a trans configuration.

One of the characteristic features of the compound represented by formula (2-1) or (2-2) resides in that the structure contains no halogen. Owing to the liquid crystal compound as the second component having the structure, the liquid crystal composition of the invention can have a small viscosity, a large specific resistance, a low minimum temperature of a nematic phase, and a controlled maximum temperature of a nematic phase.

The liquid crystal compound represented by formula (2-1) (hereinafter, sometimes referred to as a compound (2-1)) among the compounds has substantially no dielectric anisotropy, has such a maximum temperature of a nematic phase that is not necessarily high as compared to an ordinary liquid crystal compound, and has such characteristics as a small viscosity, a small to moderate optical anisotropy, and a large specific resistance.

The liquid crystal compound represented by formula (2-2) (hereinafter, sometimes referred to as a compound (2-2)) among the compounds has substantially no dielectric anisotropy, such a maximum temperature of a nematic phase that is high as compared to an ordinary liquid crystal compound, and has such characteristics as a moderate viscosity, a small to moderate optical anisotropy, and a large specific resistance.

Among the liquid crystal compounds (2-1) and (2-2), compounds represented by formulas (2-1-1) to (2-1-2) and (2-2-1) to (2-2-3) are preferred:

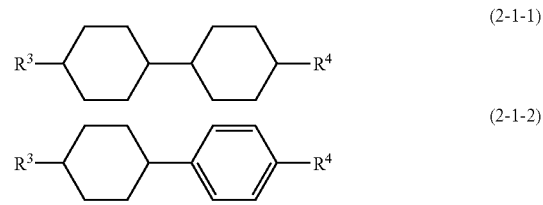

(2-1-1)

(2-1-2)

-continued

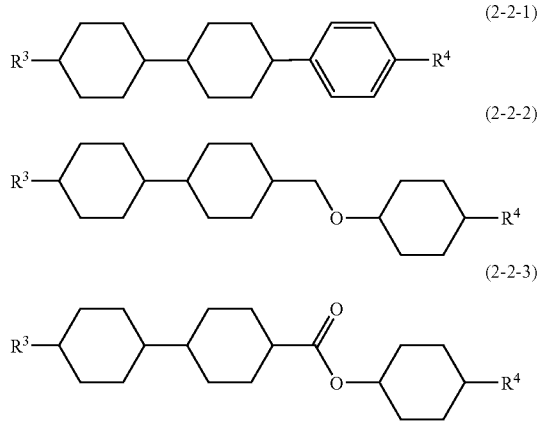

In the formulas, $R^3$ and $R^4$ have the same meanings as in the compounds (2-1) and (2-2). The steric configuration of 1,4-cyclohexylene contained in the compounds is preferably a trans configuration.

In the case where the liquid crystal compound as the second component of the liquid crystal composition of the invention is a compound represented by the aforementioned formulas, the liquid crystal composition can have a small viscosity, a low minimum temperature of a nematic phase, a controlled maximum temperature of a nematic phase, and a small optical anisotropy.

Among the compounds represented by formulas (2-1-1) to (2-1-2) and (2-2-1) to (2-2-3), liquid crystal compounds represented by formulas (2-1-1), (2-1-2) and (2-2-1) are more preferred.

In the case where the liquid crystal compound as the second component of the liquid crystal composition of the invention is a compound represented by the aforementioned formulas, the liquid crystal composition can have a large specific resistance, a low minimum temperature of a nematic phase of the liquid crystal composition, a controlled maximum temperature of a nematic phase of the liquid crystal composition, and a small optical anisotropy, and in particular, has a small viscosity.

Third Component

The liquid crystal composition of the invention contains, depending on necessity, a third component containing at least one compound selected from a group of compounds represented by formulas (3-1) and (3-2):

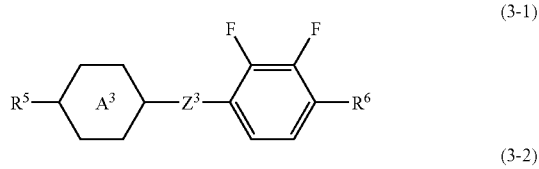

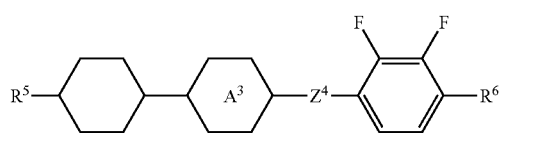

In the formulas, independently, $R^5$, $R^6$ and $A^3$ are defined as follows.

$R^5$ is alkyl having 1 to 8 carbons or alkenyl having 2 to 8 carbons. In the alkyl and alkenyl, linear alkyl and alkenyl having a linear alkyl chain, specifically, methyl, ethyl, propyl, butyl, pentyl, hexyl, heptyl and octyl, and vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl and 5-hexenyl are preferred, and ethyl, propyl, butyl, pentyl and heptyl, and vinyl, 1-propenyl, 3-butenyl and 3-pentenyl are more preferred.

The preferred steric configuration of $R^5$ when $R^5$ is alkenyl is the same as in $R^3$ in the compounds (2-1) and (2-2).

$R^6$ is alkyl having 1 to 8 carbons or alkoxy having 1 to 7 carbons. In the alkoxy, alkoxy having a linear alkyl chain, specifically, methoxy, ethoxy, propoxy, butoxy, pentyloxy, hexyloxy and heptyloxy are preferred, and methoxy, ethoxy, propoxy and butoxy are more preferred.

Ring $A^3$ is 1,4-cyclohexylene or 1,4-phenylene.

$Z^3$ is a single bond, —$C_2H_4$—, —$OCF_2$—, —$OCF_2C_2H_4$— or —$C_2H_4COO$—, and $Z^4$ is a single bond, —$C_2H_4$—, —$OCF_2$— or —$OCF_2C_2H_4$—.

In the case where the ring contained in the compound represented by formula (3-1) or (3-2) is 1,4-cyclohexylene, the steric configuration thereof is preferably a trans configuration.

One of the characteristic features of the compound represented by formula (3-1) or (3-2) resides in that the structure contains 2,3-difluorophenylene as one of the groups having a ring structure, and also contains alkoxy or alkyl as an end group. Owing to the liquid crystal compound as the third component having the structure, the liquid crystal composition of the invention can have a negatively large dielectric anisotropy.

The liquid crystal compound represented by formula (3-1) (hereinafter, sometimes referred to as a compound (3-1)) among the compounds has such a maximum temperature of a nematic phase that is not necessarily high as compared to an ordinary liquid crystal compound, but has such characteristics as a moderate dielectric anisotropy, a large specific resistance, a moderate viscosity, and a moderate optical anisotropy.

The liquid crystal compound represented by formula (3-2) (hereinafter, sometimes referred to as a compound (3-2)) among the compounds has such a viscosity that is not necessarily low as compared to an ordinary liquid crystal compound, but has such characteristics as a large specific resistance, a relatively high maximum temperature of a nematic phase, a moderate to relatively large optical anisotropy, and a high dielectric anisotropy.

Among the liquid crystal compounds (3-1) and (3-2), compounds represented by formulas (3-1-1) to (3-1-4) and (3-2-1) to (3-2-4) are preferred:

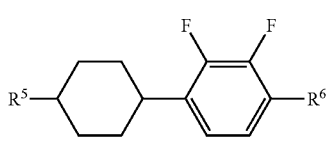

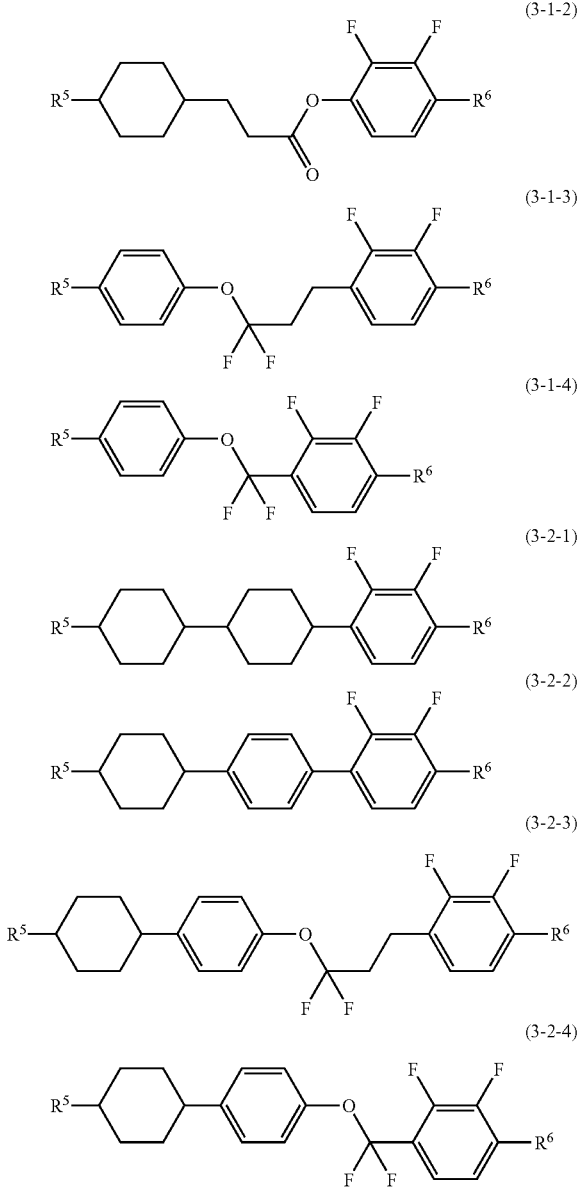

In the formulas, $R^5$ and $R^6$ have the same meanings as in the compounds (3-1) and (3-2). The steric configuration of 1,4-cyclohexylene contained in the compounds is preferably a trans configuration. Also, the compounds wherein $R^6$ independently represent an alkoxy group are preferred.

In the case where the liquid crystal compound as the third component of the liquid crystal composition of the invention is a compound represented by the aforementioned formulas, the liquid crystal composition can have a negatively large dielectric anisotropy.

Among the compounds represented by formulas (3-1-1) to (3-1-4) and (3-2-1) to (3-2-4), liquid crystal compounds represented by formulas (3-1-1), (3-2-1) and (3-2-2) are more preferred, and liquid crystal compounds represented by formulas (3-1-1) and (3-2-1) are particularly preferred.

In the case where the liquid crystal compound as the third component of the liquid crystal composition of the invention is a compound represented by the aforementioned formulas, the liquid crystal composition can have a negatively large dielectric anisotropy, a large specific resistance, and a suitable optical anisotropy. In the case where $R^6$ is alkoxy, in particular, the dielectric anisotropy can be further negatively large.

In the case of liquid crystal compounds represented by formulas (3-2-1) and (3-2-2), the maximum temperature of a nematic phase of the liquid crystal composition can be high. In the case of a liquid crystal compound represented by formula (3-1-1), the maximum temperature of a nematic phase of the liquid crystal composition can be controlled while the viscosity thereof is suppressed from being increased.

Synthesis Method of Liquid Crystal Compounds

The preparation methods of the liquid crystal compounds as the first to third components will be explained.

The compounds (1-1) and (1-2) represented by compounds represented by formulas (1-1-1) to (1-1-6) and (1-2-1) to (1-2-12) can be synthesized by the methods disclosed in WO98/23561 and Japanese Patent Application No. 2005-59154.

The compounds (2-1) and (2-2) represented by compounds represented by formulas (2-1-1) and so forth can be synthesized by the methods disclosed in JP S59-70624 A/1984 and JP S60-16940 A/1985.

The compounds (3-1) and (3-2) represented by compounds represented by formulas (3-1-1), (3-2-2) and so forth can be synthesized by the methods disclosed in JP H06-228037 A/1994.

The compounds for which preparation methods were not described above can be prepared according to the methods described in Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Kouza) (Maruzen, Inc.), and so forth.

The combination of the components and the preferred content ratios of the components in the composition will be described. It is preferred that each of the components contains plural compounds rather than only one compound since the minimum temperature of a nematic phase of the liquid crystal composition can be decreased.

Liquid Crystal Composition (1)

One of the characteristic features of the liquid crystal composition of the invention resides in the combination of the first component and the second component (hereinafter, sometimes referred to as a liquid crystal composition (1)).

Owing to the combination of the two components, the temperature range of a nematic phase of the liquid crystal composition is enhanced, and the liquid crystal composition has a suitable optical anisotropy, a negatively large dielectric anisotropy, and a large specific resistance. In particular, the minimum temperature of a nematic phase of the liquid crystal composition of the invention can be low, and preferably approximately −20° C. or less, and the optical anisotropy thereof can be small.

The liquid crystal composition of the invention having a combination of the first and second components has a smaller optical anisotropy in comparison to the conventional liquid crystal composition having a combination of the second and third components of the invention.

The content ratio of the first component in the liquid crystal composition (1) of the invention is not particularly limited and is preferably from approximately 20 to approximately 90% by weight, and more preferably from approximately 40 to approximately 85% by weight, based on the total weight of the liquid crystal compounds in the liquid crystal composition (1).

In the case where the content ratio of the first component is in the aforementioned range, the threshold voltage of the liquid crystal composition can be decreased, and the minimum temperature thereof can be decreased.

The content ratio of the second component in the liquid crystal composition (1) of the invention is not particularly limited and is preferably from approximately 10 to approximately 80% by weight, and more preferably from approximately 15 to approximately 60% by weight, based on the total weight of the liquid crystal compounds.

In the case where the content ratio of the second component is in the aforementioned range, the viscosity of the liquid crystal composition can be decreased, the dielectric anisotropy thereof can be negatively increased, and the threshold voltage thereof can be decreased.

In the case where the content ratios of the first and second components are in the aforementioned ranges, the minimum temperature of a nematic phase of the liquid crystal composition can be decreased. It is preferred that the content ratios of the first and second components are in the aforementioned ranges, and the content ratios of the respective compounds of the first component are approximately 15% by weight or less per one compound, and more preferably the content ratios of the compounds represented by formula (1-2) are approximately 10% by weight or less per one compound, in which the minimum temperature of a nematic phase of the liquid crystal composition can be easily controlled to approximately −20° C. or less.

In the case where the first component is constituted only by compounds represented by formulas (1-1-1) to (1-1-6) and (1-2-1) to (1-2-6), and the second component contains a compound represented by formula (2-1-1), the optical anisotropy of the liquid crystal composition can be decreased.

Liquid Crystal Composition (2)

The liquid crystal composition of the invention preferably contains the third component in addition to the first and second components (hereinafter, sometimes referred to as a liquid crystal composition (2)). Owing to the combination of the components, the temperature range of a nematic phase of the liquid crystal composition is enhanced, and the liquid crystal composition has a small viscosity, a suitable optical anisotropy, a negatively large dielectric anisotropy, and a large specific resistance, and the composition is properly balanced among these characteristics.

By combining the third component with the first and second components, the minimum temperature of a nematic phase of the liquid crystal composition can be further decreased in some cases.

The content ratios of the first, second and third components in the liquid crystal composition (2) of the invention are not particularly limited. It is preferred that the content ratio of the first component is from approximately 10 to approximately 80% by weight, the content ratio of the second component is from approximately 10 to approximately 80% by weight, and the content ratio of the third component is from approximately 10 to approximately 80% by weight, based on the total weight of the liquid crystal composition, and it is more preferred that the content ratio of the first component is from approximately 30 to approximately 70% by weight, the content ratio of the second component is from approximately 10 to approximately 50% by weight, and the content ratio of the third component is from approximately 20 to approximately 60% by weight, based on the total weight of the liquid crystal composition In the case where the content ratios of the first, second and third components in the liquid crystal composition (2) are in the aforementioned ranges, the dielectric anisotropy of the liquid crystal composition can be further enhanced, and the minimum temperature of a nematic phase thereof can be further decreased.

In the case where the content ratios of the first, second and third components are in the aforementioned ranges, the minimum temperature of a nematic phase of the liquid crystal composition can be decreased. It is preferred that the content ratios of the first, second and third components are in the aforementioned ranges, and the content ratios of the respective compounds of the first and third components are approximately 15% by weight or less per one compound, and more preferably the content ratios of the compounds represented by formulas (1-2) and (3-2) are approximately 10% by weight or less per one compound, in which the minimum temperature of a nematic phase of the liquid crystal composition can be easily controlled to approximately −20° C. or less.

In the case where the first component is constituted only by compounds represented by formulas (1-1-1) to (1-1-6) and (1-2-1) to (1-2-6), the second component contains a compound represented by formula (2-1-1), and the third component is constituted only by compounds represented by formulas (3-1-1) and (3-2-1), the optical anisotropy of the liquid crystal composition can be decreased.

Embodiments of Liquid Crystal Composition

The liquid crystal composition of the invention may contain, in addition to the first and second component and the third component added depending on necessity, another liquid crystal compound in some cases for controlling the characteristics of the liquid crystal composition. The liquid crystal composition of the invention may not contain any other liquid crystal compound than the first and second component and the third component added depending on necessity from the standpoint, for example, of cost.

The liquid crystal composition of the invention may further contain an additive, such as an optically active compound, a coloring matter, a defoaming agent, an ultraviolet ray absorbent and an antioxidant.

In the case where an optically active compound is added to the liquid crystal composition of the invention, a helical structure can be induced in the liquid crystal to apply a twist angle thereto.

In the case where a coloring matter is added to the liquid crystal composition of the invention, the composition can be applied to a liquid crystal display device having a guest host (GH) mode.

In the case where a defoaming agent is added to the liquid crystal composition of the invention, the composition can be prevented from being foamed during transportation of the liquid crystal composition or during the production process of a liquid crystal display device with the liquid crystal composition.

In the case where an ultraviolet ray absorbent or an antioxidant is added to the liquid crystal composition of the invention, the liquid crystal composition or a liquid crystal display device containing the liquid crystal composition can be prevented from being deteriorated. For example, an antioxidant can suppress the specific resistance from being decreased upon heating the liquid crystal composition.

Examples of the ultraviolet ray absorbent include a benzophenone ultraviolet ray absorbent, a benzoate ultraviolet ray absorbent and a triazole ultraviolet ray absorbent.

Specific examples of the benzophenone ultraviolet ray absorbent include 2-hydroxy-4-octoxybenzophenone.

Specific examples of the benzoate ultraviolet ray absorbent include 2,4-di-tert-butylphenyl-3,5-di-tert-butyl-4-hydroxybenzoate.

Specific examples of the triazole ultraviolet ray absorbent include 2-(2-hydroxy-5-methylphenyl)benzotriazole, 2-(2-hydroxy-3-(3,4,5,6-tetrahydroxyphthalimide-methyl)-5-methylphenyl)benzotriazole and 2-(3-tert-butyl-2-hydroxy-5-methylphenyl)-5-chlorobenzotriazole.

Examples of the antioxidant include a phenol antioxidant and an organic sulfur antioxidant.

Specific examples of the phenol antioxidant include 3,5-di-tert-butyl-4-hydroxytoluene, 2,6-di-tert-butyl-4-propylphenol, 2,6-di-tert-butyl-4-pentylphenol, 2,6-di-tert-butyl-4-heptylphenol, 2,2'-methylenebis(6-tert-butyl-4-methylphenol), 4,4'-butylidenebis(6-tert-butyl-3-methylphenol), 2,6-di-tert-butyl-4-(2-octadecyloxycarbonyl)ethylphenol and pentaerythritol tetrakis(3-(3,5-di-tert-butyl-4-hydroxyphenyl)propionate).

Specific examples of the organic sulfur antioxidant include dilauryl-3,3'-thiopropionate, dimyristyl-3,3'-thiopropyonate, distearyl-3,3'-thiopropionate, pentaerythritol tetrakis(3-laurylthiopropionate) and 2-mercaptobenzimidazole.

The additives represented by an ultraviolet ray absorbent and an antioxidant can be used in such an amount range that the objects of the addition of the additives are attained, but the objects of the invention are not impaired. For example, in the case where the ultraviolet ray absorbent is added, the addition amount thereof is generally from approximately 100 to approximately 1,000,000 ppm, preferably from approximately 100 to approximately 10,000 ppm, and more preferably from approximately 1,000 to approximately 10,000 ppm, based on the total weight of the liquid crystal compounds. For example, in the case where the antioxidant is added, the addition amount thereof is generally from approximately 10 to approximately 500 ppm, preferably from approximately 30 to approximately 300 ppm, and more preferably from approximately 40 to approximately 200 ppm, based on the total weight of the liquid crystal compounds.

The liquid crystal composition of the invention may contain, in some cases, impurities, such as a synthesis raw material, a by-product, a reaction solvent and a synthesis catalyst, that are mixed therein during the synthesis process of the compounds constituting the liquid crystal composition and the preparation process of the liquid crystal composition.

Production Method of Liquid Crystal Composition

The liquid crystal composition of the invention can be prepared, for example, by mixing by shaking the component compounds when the compounds are in a liquid state, or by mixing the compounds, which are then melted by heating, followed by shaking when the compounds contains one in a solid state. The liquid crystal composition of the invention can also be prepared by the other known methods.

Characteristics of the Liquid Crystal Composition

The liquid crystal composition of the invention can have a wide temperature range of a nematic phase, for example, the maximum temperature of a nematic phase can be 70° C. or more, and the minimum temperature of a nematic phase can be −20° C. or less. Accordingly, a liquid crystal display device containing the liquid crystal composition can be used in a wide temperature range.

The liquid crystal composition of the invention generally has an optical anisotropy of from approximately 0.07 to approximately 0.10. The liquid crystal composition of the invention can have an optical anisotropy in a range of from approximately 0.06 to approximately 0.13 or in a range of from approximately 0.05 to approximately 0.18, by appropriately controlling the composition and so forth.

The liquid crystal composition of the invention generally has a dielectric anisotropy of from approximately −5.0 to approximately −2.0, and preferably a liquid crystal composition having a dielectric anisotropy of from approximately −4.5 to approximately −2.5 can be obtained. A liquid crystal composition having a dielectric anisotropy in the aforementioned ranges can be preferably applied to liquid crystal display devices having an IPS mode and a VA mode.

In the liquid crystal composition of the invention, such a liquid crystal composition can be generally obtained that has both an optical anisotropy in the aforementioned ranges and a dielectric anisotropy in the aforementioned ranges.

In order to maximize a contrast ratio of a liquid crystal display device driven in an IPS mode or a VA mode, it can be designed in such a manner that the product (Δn·d) of the optical anisotropy (Δn) of the liquid crystal composition and the cell gap (d) of the liquid crystal display device is a constant value. In a VA mode, the value (Δn·d) is preferably in a range of from approximately 0.30 to approximately 0.35 μm, and in an IPS mode, the value (Δn·d) is preferably in a range of from approximately 0.20 to approximately 0.30 μm. The cell gap (d) is generally from approximately 3 to approximately 6 μm, and therefore, the optical anisotropy of the liquid crystal composition is preferably in a range of from approximately 0.050 to approximately 0.110 in order to maximize the contrast ratio.

In the case where the cell gap (d) is approximately 4 μm or more in a VA mode, there are some cases where it is not preferred since the liquid crystal display device has a large response time. A short response time is demanded for displaying a moving image, and a liquid crystal display device having a cell gap (d) of less than 4 μm is used therefor. The optical anisotropy of the liquid crystal composition used therefor is larger than the ordinary range of optical anisotropy and is, for example, in a range of from approximately 0.10 to approximately 0.15. The situation is also applicable to an IPS mode.

Liquid Crystal Display Device

The liquid crystal composition can be applied to a liquid crystal display device. The liquid crystal display device of the invention can have such an operation mode as a PC mode, a TN mode, an STN mode and an OCB mode and driven in an AM mode, or can have such an operation mode as a PC mode, a TN mode, an STN mode, an OCB mode, a VA mode and an IPS mode and driven in a passive matrix (PM) mode.

The liquid crystal display device driven in an AM mode or a PM mode can be applied to a liquid crystal display of any type, i.e., a reflection type, a transmission type or a semi-transmission type.

The liquid crystal composition of the invention can be applied to a dynamic scattering (DS) mode device using a liquid crystal composition containing an electroconductive agent, a nematic curvilinear aligned phase (NCAP) device prepared by microcapsulating a liquid crystal composition, and a polymer dispersed (PD) device in which a three dimensional net-work polymer is formed in a liquid crystal composition, for example, a polymer network (PN) device.

Owing to the aforementioned characteristics of the liquid crystal composition of the invention, the liquid crystal composition can be preferably applied to an AM mode liquid crystal display device driven in an operation mode utilizing negative dielectric anisotropy, such as a VA mode and an IPS mode, and particularly preferably applied to an AM mode liquid crystal display device driven in a VA mode.

In a liquid crystal display device driven in a TN mode, a VA mode or the like, the direction of the electric field is perpendicular to the liquid crystal layer. In a liquid crystal display device driven in an IPS mode or the like, the direction of the electric field is in parallel to the liquid crystal layer. The structure of the liquid crystal display device driven in a VA mode has been reported in K. Ohmuro, S. Kataoka, T. Sasaki and Y. Koike, SID '97 Digest of Technical Papers, vol. 28, p. 845 (1997), and the structure of the liquid crystal display device driven in an IPS mode has been reported in International Publication 91/10936/1991 (U.S. Pat. No. 5,576,867).

EXAMPLE

The invention will be explained in detail by way of Examples. The invention is not limited by the Examples described below. The liquid crystal compounds used in the Examples are expressed by the symbols according to the definition in Table 1 below. The steric configuration of 1,4-cyclohexylene in Table 1 is a trans configuration. The ratio (percentage) of the liquid crystal compound is percentage by weight (% by weight) based on the total weight of liquid crystal compounds unless otherwise indicated. In the Examples described below, the liquid crystal composition is prepared by precisely weighing and mixing the component compounds. Last, the characteristics of the composition are summarized.

The numerals attached to the liquid crystal compounds used in the Examples correspond to the formula numbers representing the liquid crystal compounds used as the first, second and third components of the invention, and the case where no formula number is indicated but a symbol "-" is indicated means another liquid crystal compound that does not correspond to the components of the invention.

The method of description of compounds using symbols is shown below.

| (1) Left Terminal Group R— | Symbol |
|---|---|
| $C_nH_{2n+1}$— | n- |
| $CH_2=CH$— | V— |
| $C_nH_{2n+1}CH=CH$— | nV— |
| $CH_2=CHC_nH_{2n+1}$— | Vn- |
| (2) Ring Structure —An— | Symbol |
|  | B |
| 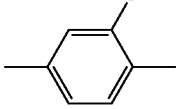 | B(3F) |
|  | B(2F, 3Cl) |
| 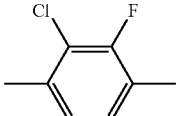 | B(2Cl, 3F) |

-continued

| | |
|---|---|
| 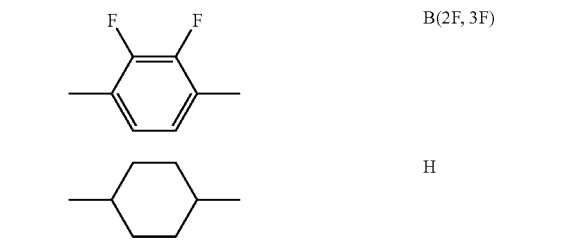 | B(2F, 3F) |
| | H |
| (3) Bonding Group —Zn— | Symbol |
| —$C_2H_4$— | 2 |
| —$CH_2O$— | 1O |
| —$CF_2O$— | $CF_2O$ |
| —$OCF_2$— | $OCF_2$ |
| —$OCF_2C_2H_4$— | $OCF_22$ |
| —COO— | E |
| —$C_2H_4COO$— | 2E |
| (4) Right Terminal Group —X— | Symbol |
| —$C_nH_{2n+1}$ | -n |
| —$OC_nH_{2n+1}$ | —On |
| —$C_nH_{2n}OC_mH_{2m+1}$ | -nOm |
| —CH=$CH_2$ | —V |
| —$C_nH_{2n}CH=CH_2$ | -nV |
| (5) Example of Description | |

Example (1) 3-HH2B(2F, 3Cl)—O1

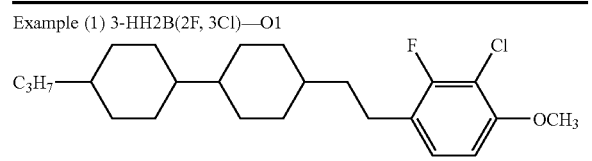

Example (2) 5-HB(2Cl, 3F)—O2

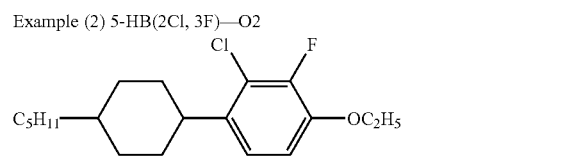

Example (3) V2-HHB-1

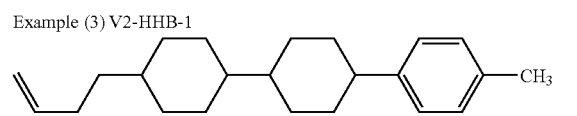

Example (4) 3-BOCF$_2$B(2F, 3F)—O2

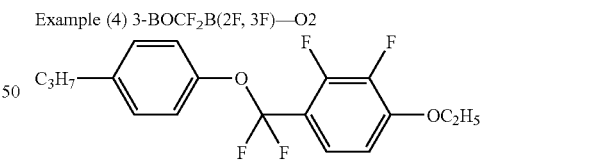

Measurements of the characteristics were carried out according to the following methods. Most methods are described in the Standard of Electric Industries Association of Japan, EIAJ ED-2521 A or those with some modifications.

(1) Maximum Temperature of a Nematic Phase (NI; ° C.)

A sample was placed on a hot plate in a melting point apparatus equipped with a polarizing microscope and was heated at the rate of 1° C. per minute. A temperature was measured when a part of the sample began to change from a nematic phase into an isotropic liquid. A higher limit of a temperature range of a nematic phase may be abbreviated to "a maximum temperature".

(2) Minimum Temperature of a Nematic Phase (Tc; ° C.)

A sample having a nematic phase was kept in a freezer at temperatures of 0° C., −10° C., −20° C., −30° C. and −40° C. for ten days, respectively, and the liquid crystal phase was observed. For example, when the sample remained in a nematic phase at −20° C. and changed to crystals or a smectic phase at −30° C., Tc was expressed as $\leq$ −20° C. A lower limit of a temperature range of a nematic phase may be abbreviated to "a minimum temperature".

(3) Optical Anisotropy (Δn; Measured at 25° C.)

Measurement was carried out with an Abbe refractometer mounting a polarizing plate on an ocular using a light at a wavelength of 589 nm. The surface of a main prism was rubbed in one direction, and then a sample was dropped on the main prism. The refractive index n∥ was measured when the direction of the polarized light was parallel to that of the rubbing, and the refractive index n⊥ was measured when the direction of the polarized light was perpendicular to that of the rubbing. A value (Δn) of optical anisotropy was calculated from the equation:

$$\Delta n = n\| - n\perp$$

(4) Viscosity (η; mPa·s, measured at 20° C.)

The measurement was carried out by using an E-type viscometer.

(5) Dielectric Anisotropy (Δ∈; measured at 25° C.)

A solution of octadecyltriethoxysilane (0.16 mL) dissolved in ethanol (20 mL) was coated on a glass substrate having been well cleaned. The glass substrate was rotated with a spinner and then heated to 150° C. for 1 hour. A VA device having a distance (cell gap) of 20 μm was fabricated with two sheets of the glass substrates.

A polyimide orientation film was coated on a glass substrate having been well cleaned. The orientation film on the glass substrate was baked and then subjected to a rubbing treatment. A TN element having a distance between two sheets of the glass substrates of 9 μm and a twisted angle of 80° was fabricated.

A specimen was charged in the VA device, to which a voltage of 0.5 V (1 kHz, sine wave) was applied, and a dielectric constant (∈∥) in the major axis direction of the liquid crystal molecule was measured.

A specimen was charged in the TN device, to which a voltage of 0.5 V (1 kHz, sine wave) was applied, and a dielectric constant (∈⊥) in the minor axis direction of the liquid crystal molecule was measured.

The dielectric anisotropy Δ∈ was calculated by the equation:

$$\Delta\in = \in\| - \in\perp$$

A composition having the negative value is a composition having a negative dielectric anisotropy.

(6) Voltage Holding Ratio (VHR; Measured at 25° C. and 100° C.; %)

A specimen was charged in a TN device having a polyimide orientation film and having a distance between two glass substrate (cell gap) of 6 μm. A pulse voltage (60 μs at 5 V) was applied to the TN device at 25° C. to charge the device. The waveform of the voltage applied to the TN device was observed with a cathode ray oscilloscope, and an area surrounded by the voltage curve and the abscissa per unit cycle (16.7 ms) was obtained. The area was obtained in the same manner from a waveform obtained after removing the TN device. The value of the voltage holding ratio (%) was calculated by the equation:

(voltage holding ratio)=(area with TN device)/(area without TN device)×100

The voltage holding ratio thus obtained was designated as VHR-1. Subsequently, the TN device was heated to 100° C. for 250 hours. After cooling the TN device to 25° C., the voltage holding ratio was measured in the same manner. The voltage holding ratio obtained after the heating test was designated as VHR-2. The heating test is an accelerating test and is a test corresponding to a long term durability test of the TN device.

(7) Specific Resistance (ρ; measured at 25° C.; Ωcm)

1.0 mL of a liquid crystal was charged in a liquid cell, to which a direct current voltage of 10 V was applied. After lapsing 10 seconds from the application of voltage, the direct electric current of the cell was measured for calculating the specific resistance. The specific resistance was calculated by the equation:

(specific resistance)=((voltage)×(cell capacity))/((direct current)×(dielectric constant of vacuum))

(8) Gas Chromatographic Analysis

Gas Chromatograph Model GC-14B made by Shimadzu Corp. or an equivalent thereof was used as a measuring apparatus. Capillary Column CBP1-M25-025 (length: 25 m, bore: 0.22 mm, film thickness: 0.25 μm, dimethylpolysiloxane as stationary phase, no polarity) made by Shimadzu Corp. was used as a column. Helium was used as a carrier gas, and the flow rate was controlled to 2 mL/min. The column was maintained at 200° C. for 2 minutes and then further heated to 280° C. at a rate of 5° C. per minute. A specimen evaporating chamber and a detector (FID) were set up at 280° C. and 300° C., respectively.

A specimen was dissolved in acetone to prepare a solution of 0.1% by weight, and 1 μL of the resulting solution was injected into the specimen evaporating chamber.

The recorder used was Chromatopac Model C-R5A made by Shimadzu Corp. or an equivalent thereof. Gas chromatogram obtained showed a retention time of a peak and a peak area corresponding to the component compound.

The solvent for diluting the specimen may also be, for example, chloroform or hexane. The following capillary columns may also be used: DB-1 made by Agilent Technologies Inc. (length: 30 m, bore: 0.32 mm, film thickness: 0.25 μm), HP-1 made by Agilent Technologies Inc. (length: 30 m, bore: 0.32 mm, film thickness: 0.25 μm), Rtx-1 made by Restek Corp. (length: 30 m, bore: 0.32 mm, film thickness: 0.25 μm), and BP-1 made by SGE International Pty. Ltd. (length: 30 m, bore: 0.32 mm, film thickness: 0.25 μm). In order to prevent compound peaks from overlapping, a capillary column CBP1-M50-025 (length: 50 m, bore: 0.25 mm, film thickness: 0.25 μm) made by Shimadzu Corp. may be used.

An area ratio of each peak in the gas chromatogram corresponds to the ratio of the component compounds. In general, the percentage by weight of the component compound is not completely identical to the area ratio of each peak. According to the invention, however, the percentage by weight of the component compound may be regarded to be identical to the percentage by area of each peak since the correction coefficient is substantially 1 when these capillary columns are used. This is because there is no significant difference in correction coefficient among the liquid crystal compounds as the component compounds. In order to obtain more precisely the compositional ratio of the liquid crystal compounds in the liquid crystal composition by gas chromatogram, an internal reference method is applied to gas chromatogram. The liquid crystal compound components (components to be measured) having been precisely weighed and a standard liquid crystal compound (standard substance) are simultaneously measured by gas chromatography, and the relative intensity of the area ratio of peaks of the components to be measured and a peak of the standard substance is calculated in advance. The compositional ratio of the liquid crystal compounds in the liquid crystal composition can be precisely obtained by gas chromatography analysis by correcting using the relative intensity of the peak areas of the components with respect to the standard substance.

Comparative Example 1

The following composition containing the second component and the third component of the invention was prepared, and the characteristic values thereof were measured by the aforementioned methods.

| | | |
|---|---|---|
| 3-HH-4 | (2-1-1) | 7% |
| 3-HH-5 | (2-1-1) | 7% |
| 3-HB-O1 | (2-1-2) | 8% |
| 5-HB-3 | (2-1-2) | 8% |
| 3-HB(2F,3F)—O2 | (3-1-1) | 14% |
| 5-HB(2F,3F)—O2 | (3-1-1) | 14% |
| 3-HHB(2F,3F)—O2 | (3-2-1) | 11% |
| 5-HHB(2F,3F)—O2 | (3-2-1) | 11% |
| 2-HHB(2F,3F)-1 | (3-2-1) | 10% |
| 3-HHB(2F,3F)-1 | (3-2-1) | 10% |

NI = 68.9° C.; $T_c \leq -10°$ C.; $\Delta n = 0.081$; $\Delta \epsilon = -3.3$; $\eta = 20.3$ mPa·s; VHR-1 = 99.3%

Example 1

The following composition was prepared, and the characteristic values thereof were measured by the aforementioned methods.

| | | |
|---|---|---|
| 3-HB(2F,3Cl)—O2 | (1-1-1) | 14% |
| 5-HB(2F,3Cl)—O2 | (1-1-1) | 14% |
| 3-HHB(2F,3Cl)—O2 | (1-2-1) | 8% |
| 5-HHB(2F,3Cl)—O2 | (1-2-1) | 8% |
| 3-HH2B(2F,3Cl)—O2 | (1-2-2) | 9% |
| 5-HH2B(2F,3Cl)—O2 | (1-2-2) | 9% |
| 2-HH-5 | (2-1-1) | 11% |
| 3-HH-4 | (2-1-1) | 11% |
| 3-HB—O2 | (2-1-2) | 8% |
| 5-HB—O2 | (2-1-2) | 8% |

NI = 69.3° C.; $T_c \leq -20°$ C.; $\Delta n = 0.073$; $\Delta \epsilon = -2.7$; VHR-1 = 99.4%

The composition of Example 1 had a low minimum temperature of $\leq -20°$ C. and a small optical anisotropy $\Delta n$ as compared to Comparative Example 1, and had a large voltage holding ratio.

Example 2

The following composition was prepared, and the characteristic values thereof were measured by the aforementioned methods.

| | | |
|---|---|---|
| 3-HB(2F,3Cl)—O2 | (1-1-1) | 15% |
| 5-HB(2F,3Cl)—O2 | (1-1-1) | 15% |
| 3-HHB(2F,3Cl)—O2 | (1-2-1) | 9% |
| 5-HHB(2F,3Cl)—O2 | (1-2-1) | 9% |
| 3-HBB(2F,3Cl)—O2 | (1-2-7) | 9% |
| 5-HBB(2F,3Cl)—O2 | (1-2-7) | 9% |
| 2-HH-5 | (2-1-1) | 11% |
| 3-HH-4 | (2-1-1) | 12% |
| 3-HB—O2 | (2-1-2) | 11% |

NI = 69.0° C.; $T_c \leq -20°$ C.; $\Delta n = 0.086$; $\Delta \epsilon = -3.0$; VHR-1 = 99.2%

The composition of Example 2 had a low minimum temperature of $\leq -20°$ C. as compared to Comparative Example 1, and had a large voltage holding ratio.

Example 3

The following composition was prepared, and the characteristic values thereof were measured by the aforementioned methods.

| | | |
|---|---|---|
| 3-HB(2Cl,3F)—O2 | (1-1-4) | 5% |
| 5-HB(2Cl,3F)—O2 | (1-1-4) | 5% |
| 3-H2B(2Cl,3F)—O2 | (1-1-5) | 15% |
| 5-H2B(2Cl,3F)—O2 | (1-1-5) | 15% |
| 3-HHB(2Cl,3F)—O2 | (1-2-4) | 8% |
| 5-HHB(2Cl,3F)—O2 | (1-2-4) | 8% |
| 3-HH2B(2Cl,3F)—O2 | (1-2-5) | 12% |
| 5-HH2B(2Cl,3F)—O2 | (1-2-5) | 12% |
| 5-HH—V | (2-1-1) | 17% |
| V—HHB-1 | (2-2-1) | 3% |

NI = 70.0° C.; $T_c \leq -20°$ C.; $\Delta n = 0.075$; $\Delta \epsilon = -3.4$; VHR-1 = 99.2%

The composition of Example 3 had a low minimum temperature of $\leq -20°$ C. as compared to Comparative Example 1, and had a large voltage holding ratio.

Example 4

The following composition was prepared, and the characteristic values thereof were measured by the aforementioned methods.

| | | |
|---|---|---|
| 3-HHB(2F,3Cl)—O2 | (1-2-1) | 11% |
| 5-HHB(2F,3Cl)—O2 | (1-2-1) | 11% |
| 2-HHB(2F,3Cl)-1 | (1-2-1) | 10% |
| 3-HHB(2F,3Cl)-1 | (1-2-1) | 10% |
| 3-HH-4 | (2-1-1) | 7% |
| 3-HH-5 | (2-1-1) | 7% |
| 3-HB-O1 | (2-1-2) | 8% |
| 5-HB-3 | (2-1-2) | 8% |
| 3-HB(2F,3F)—O2 | (3-1-1) | 14% |
| 5-HB(2F,3F)—O2 | (3-1-1) | 14% |

NI = 63.9° C.; $T_c \leq -20°$ C.; $\Delta n = 0.077$; $\Delta \epsilon = -3.1$; VHR-1 = 99.3%

The composition was obtained by replacing the tricyclic 2,3-difluorophenylene compound in the composition of Comparative Example 1 by the liquid crystal compound that was the first component of the invention. The composition of Example 4 had an improved low minimum temperature of $\leq -20°$ C. and a small optical anisotropy $\Delta n$ as compared to Comparative Example 1. The minimum temperature of a nematic phase could be enhanced by combining the first component. The composition also had a large voltage holding ratio.

Example 5

The following composition was prepared, and the characteristic values thereof were measured by the aforementioned methods.

| | | |
|---|---|---|
| 2-HHB(2Cl,3F)-1 | (1-2-1) | 10% |
| 3-HHB(2Cl,3F)-1 | (1-2-1) | 10% |
| 3-HHB(2Cl,3F)—O2 | (1-2-4) | 11% |
| 5-HHB(2Cl,3F)—O2 | (1-2-4) | 11% |

-continued

| | | |
|---|---|---|
| 3-HH-4 | (2-1-1) | 7% |
| 3-HH-5 | (2-1-1) | 7% |
| 3-HB—O1 | (2-1-2) | 8% |
| 5-HB-3 | (2-1-2) | 8% |
| 3-HB(2F,3F)—O2 | (3-1-1) | 14% |
| 5-HB(2F,3F)—O2 | (3-1-1) | 14% |

NI = 59.3° C.; $T_c \leq -20°$ C.; $\Delta n = 0.073$; $\Delta \epsilon = -3.1$; VHR-1 = 99.3%

The composition was obtained by replacing the tricyclic 2,3-difluorophenylene compound in the composition of Comparative Example 1 by the liquid crystal compound of the invention. The composition of Example 5 had an improved low minimum temperature of $\leq -20°$ C. and a small optical anisotropy $\Delta n$ as compared to Comparative Example 1. The minimum temperature of a nematic phase could be enhanced by combining the first component. The composition also had a large voltage holding ratio.

Example 6

The following composition was prepared, and the characteristic values thereof were measured by the aforementioned methods.

| | | |
|---|---|---|
| 3-HB(2F,3Cl)—O2 | (1-1-1) | 15% |
| 5-HB(2F,3Cl)—O2 | (1-1-1) | 14% |
| 3-HHB(2F,3Cl)—O2 | (1-2-1) | 8% |
| 5-HHB(2F,3Cl)—O2 | (1-2-1) | 8% |
| 3-HH2B(2F,3Cl)—O2 | (1-2-2) | 9% |
| 5-HH2B(2F,3Cl)—O2 | (1-2-2) | 8% |
| 3-HH—V | (2-1-1) | 16% |
| 5-HH—V | (2-1-1) | 22% |

NI = 70.1° C.; $T_c \leq -20°$ C.; $\Delta n = 0.069$; $\Delta \epsilon = -2.6$; $\eta = 20.8$ mPa·s; VHR-1 = 99.3%

The composition of Example 6 had a low minimum temperature of $\leq -20°$ C. and a small optical anisotropy $\Delta n$ of 0.069 as compared to Comparative Example 1, and had a large voltage holding ratio. The composition of the invention could have a small optical anisotropy $\Delta n$ as compared to the conventional liquid crystal composition containing a compound having 2,3-difluorophenylene.

Example 7

The following composition was prepared, and the characteristic values thereof were measured by the aforementioned methods.

| | | |
|---|---|---|
| 3-HB(2F,3Cl)—O2 | (1-1-1) | 10% |
| 4-HB(2F,3Cl)—O2 | (1-1-1) | 10% |
| 5-HB(2F,3Cl)—O2 | (1-1-1) | 10% |
| 3-HB(2Cl,3F)—O2 | (1-1-4) | 10% |
| 5-HB(2Cl,3F)—O2 | (1-1-4) | 10% |
| 3-HH-4 | (2-1-1) | 6% |
| 3-HH—V | (2-1-1) | 10% |
| 3-HHB-1 | (2-2-1) | 8% |
| 3-HHB-3 | (2-2-1) | 12% |
| V—HHB-1 | (2-2-1) | 14% |

NI = 62.6° C.; $T_c \leq -20°$ C.; $\Delta n = 0.078$; $\Delta \epsilon = -2.3$; VHR-1 = 99.4%

The composition of Example 7 had a low minimum temperature of $\leq -20°$ C. as compared to Comparative Example 1, and had a large voltage holding ratio.

Example 8

The following composition was prepared, and the characteristic values thereof were measured by the aforementioned methods.

| | | |
|---|---|---|
| 3-H2B(2F,3Cl)—O2 | (1-1-2) | 10% |
| 5-H2B(2F,3Cl)—O2 | (1-1-2) | 10% |
| 3-H1OB(2F,3Cl)—O2 | (1-1-3) | 5% |
| 5-H1OB(2F,3Cl)—O2 | (1-1-3) | 5% |
| 3-HHB(2F,3Cl)—O2 | (1-2-1) | 9% |
| 5-HHB(2F,3Cl)—O2 | (1-2-1) | 9% |
| 3-HH2B(2F,3Cl)—O2 | (1-2-2) | 10% |
| 5-HH2B(2F,3Cl)—O2 | (1-2-2) | 10% |
| 3-HH1OB(2F,3Cl)—O2 | (1-2-3) | 10% |
| 5-HH1OB(2F,3Cl)—O2 | (1-2-3) | 10% |
| 3-HH-4 | (2-1-1) | 12% |

NI = 91.2° C.; $T_c \leq -20°$ C.; $\Delta n = 0.082$; $\Delta \epsilon = -4.6$; VHR-1 = 99.2%

The composition of Example 8 had a high maximum temperature, a low minimum temperature of $\leq -20°$ C., a wide temperature range of a nematic phase and a negatively large dielectric anisotropy $\Delta \epsilon$ as compared to Comparative Example 1, and had a large voltage holding ratio.

Example 9

The following composition was prepared, and the characteristic values thereof were measured by the aforementioned methods.

| | | |
|---|---|---|
| 3-H2B(2Cl,3F)—O2 | (1-1-5) | 10% |
| 5-H2B(2Cl,3F)—O2 | (1-1-5) | 10% |
| 3-H1OB(2Cl,3F)—O2 | (1-1-6) | 10% |
| 5-H1OB(2Cl,3F)—O2 | (1-1-6) | 10% |
| 3-HH2B(2Cl,3F)—O2 | (1-2-5) | 10% |
| 5-HH2B(2Cl,3F)—O2 | (1-2-5) | 10% |
| 3-HH1OB(2Cl,3F)—O2 | (1-2-6) | 10% |
| 5-HH1OB(2Cl,3F)—O2 | (1-2-6) | 10% |
| 3-HH-4 | (2-1-1) | 10% |
| 3-HH-5 | (2-1-1) | 5% |
| 3-HH1OH-3 | (2-2-2) | 3% |
| 3-HHEH-5 | (2-2-3) | 2% |

NI = 74.3° C.; $T_c \leq -20°$ C.; $\Delta n = 0.072$; $\Delta \epsilon = -4.3$; VHR-1 = 99.1%

The composition of Example 9 had a low minimum temperature of $\leq -20°$ C., a small optical anisotropy $\Delta n$ and a negatively large dielectric anisotropy $\Delta \epsilon$ as compared to Comparative Example 1, and had a large voltage holding ratio.

Example 10

The following composition was prepared, and the characteristic values thereof were measured by the aforementioned methods.

| | | |
|---|---|---|
| 3-HB(2F,3Cl)—O2 | (1-1-1) | 16% |
| 3-HB(2F,3Cl)—O4 | (1-1-1) | 8% |
| 5-HB(2F,3Cl)—O2 | (1-1-1) | 8% |
| 2-HHB(2F,3Cl)—O2 | (1-2-1) | 5% |
| 3-HHB(2F,3Cl)—O2 | (1-2-1) | 9% |
| 4-HHB(2F,3Cl)—O2 | (1-2-1) | 5% |
| 5-HHB(2F,3Cl)—O2 | (1-2-1) | 9% |
| 5-HH—V | (2-1-1) | 26% |
| 3-HH—V1 | (2-1-1) | 10% |
| V2—HHB-1 | (2-2-1) | 4% |

NI = 73.2° C.; $T_c \leq -20°$ C.; $\Delta n = 0.074$; $\Delta \epsilon = -2.6$; VHR-1 = 99.3%

The composition of Example 10 had a low minimum temperature of $\leqq -20°$ C. and a small optical anisotropy $\Delta n$ as compared to Comparative Example 1, and had a large voltage holding ratio.

Example 11

The following composition was prepared, and the characteristic values thereof were measured by the aforementioned methods.

| | | |
|---|---|---|
| 3-HHB(2F,3Cl)—O2 | (1-2-1) | 9% |
| 5-HHB(2F,3Cl)—O2 | (1-2-1) | 9% |
| 3-HH2B(2F,3Cl)—O1 | (1-2-2) | 4% |
| 3-HH2B(2F,3Cl)—O2 | (1-2-2) | 8% |
| 5-HH2B(2F,3Cl)—O2 | (1-2-2) | 8% |
| 3-BBB(2F,3Cl)—O2 | (1-2-7) | 9% |
| 5-HBB(2F,3Cl)—O2 | (1-2-7) | 9% |
| 2-HH-5 | (2-1-1) | 8% |
| 3-HH-4 | (2-1-1) | 15% |
| 3-HB—O2 | (2-1-2) | 11% |
| 5-HB—O2 | (2-1-2) | 10% |

NI = 101.0° C.; $T_c \leqq -20°$ C.; $\Delta n$ = 0.093; $\Delta \epsilon$ = −2.5; VHR-1 = 99.4%

The composition of Example 11 had a low minimum temperature of $\leqq -20°$ C. and a wide temperature range of a nematic phase as compared to Comparative Example 1, and had a large voltage holding ratio.

Example 12

The following composition was prepared, and the characteristic values thereof were measured by the aforementioned methods.

| | | |
|---|---|---|
| 3-HB(2F,3Cl)—O2 | (1-1-1) | 5% |
| 3-H2B(2F,3Cl)—O2 | (1-1-2) | 10% |
| 3-H1OB(2F,3Cl)—O2 | (1-1-3) | 5% |
| 3-HB(2Cl,3F)—O2 | (1-1-4) | 5% |
| 3-H2B(2Cl,3F)—O2 | (1-1-5) | 10% |
| 3-H1OB(2Cl,3F)—O2 | (1-1-6) | 5% |
| 3-HHB(2F,3Cl)—O2 | (1-2-1) | 5% |
| 3-HH2B(2F,3Cl)—O2 | (1-2-2) | 10% |
| 3-HH1OB(2F,3Cl)—O2 | (1-2-3) | 5% |
| 3-HHB(2Cl,3F)—O2 | (1-2-4) | 5% |
| 3-HH2B(2Cl,3F)—O2 | (1-2-5) | 10% |
| 3-HH1OB(2Cl,3F)—O2 | (1-2-6) | 5% |
| 5-HH—V | (2-1-1) | 5% |
| V—HHB-1 | (2-2-1) | 10% |
| 3-HHB—O2 | (2-2-1) | 5% |

NI = 80.3° C.; $T_c \leqq -30°$ C.; $\Delta n$ = 0.084; $\Delta \epsilon$ = −3.9; VHR-1 = 99.3%

The composition of Example 12 had a high maximum temperature, a low minimum temperature of $\leqq -30°$ C., a wide temperature range of a nematic phase and a negatively large dielectric anisotropy $\Delta \epsilon$ as compared to Comparative Example 1, and had a large voltage holding ratio.

Example 13

The following composition was prepared, and the characteristic values thereof were measured by the aforementioned methods.

| | | |
|---|---|---|
| 3-HB(2F,3Cl)—O2 | (1-1-1) | 8% |
| 5-HB(2F,3Cl)—O2 | (1-1-1) | 7% |
| 3-HB(2Cl,3F)—O2 | (1-1-4) | 8% |
| 5-HB(2Cl,3F)—O2 | (1-1-4) | 7% |
| 2-HHB(2F,3Cl)—O2 | (1-2-1) | 3% |
| 3-HHB(2F,3Cl)—O2 | (1-2-1) | 8% |
| 5-HHB(2F,3Cl)—O2 | (1-2-1) | 7% |
| 2-HHB(2Cl,3F)—O2 | (1-2-4) | 3% |
| 3-HHB(2Cl,3F)—O2 | (1-2-4) | 8% |
| 5-HHB(2Cl,3F)—O2 | (1-2-4) | 7% |
| 3-HH-4 | (2-1-1) | 9% |
| 3-HH-5 | (2-1-1) | 5% |
| 3-HB—O2 | (2-1-2) | 7% |
| 5-HB—O2 | (2-1-2) | 7% |
| 3-HHB-1 | (2-2-1) | 4% |
| 3-HHB—O1 | (2-2-1) | 2% |

NI = 78.9° C.; $T_c \leqq -30°$ C.; $\Delta n$ = 0.081; $\Delta \epsilon$ = −3.1; VHR-1 = 99.3%

The composition of Example 13 had a high maximum temperature, a low minimum temperature of $\leqq -30°$ C. and a wide temperature range of a nematic phase as compared to Comparative Example 1, and had a large voltage holding ratio.

Example 14

The following composition was prepared, and the characteristic values thereof were measured by the aforementioned methods.

| | | |
|---|---|---|
| 3-HB(2F,3Cl)—O2 | (1-1-1) | 4% |
| 3-HB(2Cl,3F)—O2 | (1-1-4) | 4% |
| 3-HH2B(2F,3Cl)—O2 | (1-2-2) | 10% |
| 5-HH2B(2F,3Cl)—O2 | (1-2-2) | 10% |
| 3-HH2B(2Cl,3F)—O2 | (1-2-5) | 10% |
| 5-HH2B(2Cl,3F)—O2 | (1-2-5) | 10% |
| 3-HB—O2 | (2-1-2) | 5% |
| 7-HB-1 | (2-1-2) | 5% |
| 3-HHB-1 | (2-2-1) | 4% |
| 3-HHB-3 | (2-2-1) | 6% |
| 3-H2EB(2F,3F)—O2 | (3-1-2) | 4% |
| 5-H2EB(2F,3F)—O2 | (3-1-2) | 4% |
| 3-H2EB(2F,3F)—O4 | (3-1-2) | 8% |
| 4-H2EB(2F,3F)—O4 | (3-1-2) | 8% |
| 5-H2EB(2F,3F)—O4 | (3-1-2) | 8% |

NI = 78.9° C.; $T_c \leqq -20°$ C.; $\Delta n$ = 0.085; $\Delta \epsilon$ = −4.0; VHR-1 = 99.1%

The composition of Example 14 had a low minimum temperature of $\leqq -20°$ C. and a negatively large dielectric anisotropy $\Delta \epsilon$ as compared to Comparative Example 1, and had a large voltage holding ratio.

Example 15

The following composition was prepared, and the characteristic values thereof were measured by the aforementioned methods.

| | | |
|---|---|---|
| 3-HB(2F,3Cl)—O2 | (1-1-1) | 7% |
| 3-HB(2Cl,3F)—O2 | (1-1-4) | 7% |
| 3-HHB(2F,3Cl)—O2 | (1-2-1) | 8% |
| 3-HHB(2Cl,3F)—O2 | (1-2-4) | 8% |
| 2-HH-5 | (2-1-1) | 5% |
| 3-HH-4 | (2-1-1) | 10% |
| 3-HH-5 | (2-1-1) | 4% |
| 3-HB—O2 | (2-1-2) | 8% |
| 3-HB—O4 | (2-1-2) | 4% |
| 3-HHB-1 | (2-2-1) | 3% |
| V—HHB-1 | (2-2-1) | 4% |

-continued

| | | |
|---|---|---|
| 3-HB(2F,3F)—O2 | (3-1-1) | 7% |
| 5-HB(2F,3F)—O2 | (3-1-1) | 7% |
| 3-HHB(2F,3F)—O2 | (3-2-1) | 5% |
| 5-HHB(2F,3F)—O2 | (3-2-1) | 4% |
| 3-HBB(2F,3F)—O2 | (3-2-2) | 5% |
| 5-HBB(2F,3F)—O2 | (3-2-2) | 4% |

NI = 81.1° C.; $T_c \leq -30°$ C.; $\Delta n = 0.088$; $\Delta \epsilon = -2.8$; VHR-1 = 99.4%

The composition of Example 15 had a high maximum temperature, a low minimum temperature of $\leq -30°$ C. and a wide temperature range of a nematic phase as compared to Comparative Example 1, and had a large voltage holding ratio.

Example 16

The following composition was prepared, and the characteristic values thereof were measured by the aforementioned methods.

| | | |
|---|---|---|
| 3-HB(2F,3Cl)—O2 | (1-1-1) | 14% |
| 5-HB(2F,3Cl)—O2 | (1-1-1) | 14% |
| 3-HBB(2F,3Cl)—O2 | (1-2-7) | 9% |
| 5-HBB(2F,3Cl)—O2 | (1-2-7) | 9% |
| 3-HBB(2Cl,3F)—O2 | (1-2-10) | 8% |
| 5-HBB(2Cl,3F)—O2 | (1-2-10) | 8% |
| 3-HBB(2Cl,3F)—O4 | (1-2-10) | 6% |
| 3-HH-4 | (2-1-1) | 10% |
| 3-HB—O2 | (2-1-2) | 6% |
| V—HHB-1 | (2-2-1) | 8% |
| V2—HHB-1 | (2-2-1) | 8% |

NI = 81.9° C.; $T_c \leq -20°$ C.; $\Delta n = 0.110$; $\Delta \epsilon = -3.2$; VHR-1 = 99.2%

The composition of Example 16 had a low minimum temperature of $\leq -20°$ C. and a large optical anisotropy $\Delta n$ as compared to Comparative Example 1, and had a large voltage holding ratio.

Example 17

The following composition was prepared, and the characteristic values thereof were measured by the aforementioned methods.

| | | |
|---|---|---|
| 3-HB(2F,3Cl)—O2 | (1-1-1) | 8% |
| 5-HB(2F,3Cl)—O2 | (1-1-1) | 8% |
| 3-HHB(2F,3Cl)—O2 | (1-2-1) | 8% |
| 5-HHB(2F,3Cl)—O2 | (1-2-1) | 8% |
| 3-HH2B(2F,3Cl)—O2 | (1-2-2) | 9% |
| 5-HH2B(2F,3Cl)—O2 | (1-2-2) | 8% |
| 3-HH—V | (2-1-1) | 14% |
| 5-HH—V | (2-1-1) | 14% |
| 3-HH—V1 | (2-1-1) | 8% |
| V—HHB-1 | (2-2-1) | 2% |
| 3-BOCF₂B(2F,3F)—O2 | (3-1-3) | 8% |
| 3-HBOCF₂B(2F,3F)—O2 | (3-2-3) | 5% |

NI = 75.4° C.; $T_c \leq -20°$ C.; $\Delta n = 0.075$; $\Delta \epsilon = -2.5$; $\eta = 19.1$ mPa·s; VHR-1 = 99.2%

The composition of Example 17 had a low minimum temperature of $\leq -20°$ C. as compared to Comparative Example 1, and had a large voltage holding ratio.

Example 18

The following composition was prepared, and the characteristic values thereof were measured by the aforementioned methods.

| | | |
|---|---|---|
| 5-H1OB(2F,3Cl)—O2 | (1-1-3) | 6% |
| 3-HHB(2F,3Cl)—O2 | (1-2-1) | 5% |
| 3-HH1OB(2F,3Cl)—O2 | (1-2-3) | 6% |
| 3-HHB(2Cl,3F)—O2 | (1-2-4) | 5% |
| 3-HH-4 | (2-1-1) | 8% |
| 3-HH-5 | (2-1-1) | 5% |
| 3-HB—O2 | (2-1-2) | 7% |
| 5-HB-3 | (2-1-2) | 4% |
| 7-HB-1 | (2-1-2) | 5% |
| V—HHB-1 | (2-2-1) | 5% |
| V2—HHB-1 | (2-2-1) | 5% |
| 3-HB(2F,3F)—O2 | (3-1-1) | 10% |
| 5-HB(2F,3F)—O2 | (3-1-1) | 10% |
| 3-HHB(2F,3F)—O2 | (3-2-1) | 9% |
| 5-HHB(2F,3F)—O2 | (3-2-1) | 9% |

NI = 78.3° C.; $T_c \leq -20°$ C.; $\Delta n = 0.082$; $\Delta \epsilon = -3.4$; VHR-1 = 99.4%

The composition of Example 18 had a low minimum temperature of $\leq -20°$ C. as compared to Comparative Example 1, and had a large voltage holding ratio.

Example 19

The following composition was prepared, and the characteristic values thereof were measured by the aforementioned methods.

| | | |
|---|---|---|
| 3-HH1OB(2F,3Cl)—O2 | (1-2-3) | 10% |
| 5-HH1OB(2F,3Cl)—O2 | (1-2-3) | 10% |
| 3-HHB(2Cl,3F)—O2 | (1-2-4) | 8% |
| 5-HHB(2Cl,3F)—O2 | (1-2-4) | 8% |
| 3-HH2B(2Cl,3F)—O2 | (1-2-5) | 8% |
| 5-HH2B(2Cl,3F)—O2 | (1-2-5) | 8% |
| 3-HH—V | (2-1-1) | 20% |
| 5-HH—V | (2-1-1) | 28% |

NI = 80.5° C.; $T_c \leq -20°$ C.; $\Delta n = 0.065$; $\Delta \epsilon = -2.1$; VHR-1 = 99.3%

The composition of Example 19 had a high maximum temperature, a low minimum temperature of $\leq -20°$ C. and a small optical anisotropy $\Delta n$ OF 0.065 as compared to Comparative Example 1, and had a large voltage holding ratio. The composition of the invention could have a small optical anisotropy $\Delta n$ as compared to the conventional liquid crystal composition containing a compound having 2,3-difluorophenylene.

Example 20

100 ppm of 3,5-di-tert-butyl-4-hydroxytoluene as an antioxidant was added to the composition of Example 2, and the composition had the following characteristic values. NI=69.0° C.; $T_c \leq -20°$ C.; $\Delta n=0.086$; $\Delta \epsilon=-3.0$; VHR-1=99.2%

Example 21

The following composition was prepared, to which 150 ppm of 3,5-di-tert-butyl-4-hydroxytoluene as an antioxidant was added. The characteristic values of the composition were measured by the aforementioned methods.

| | | |
|---|---|---|
| 3-HB(2F,3Cl)—O2 | (1-1-1) | 15% |
| 5-HB(2F,3Cl)—O2 | (1-1-1) | 15% |
| V-HHB(2F,3Cl)—O2 | (1-2-1) | 6% |
| 1V-HHB(2F,3Cl)—O2 | (1-2-1) | 6% |
| V2-HHB(2F,3Cl)—O2 | (1-2-1) | 6% |
| 3-HBB(2F,3Cl)—O2 | (1-2-7) | 6% |
| 5-HBB(2F,3Cl)—O2 | (1-2-7) | 6% |
| 1V-HBB(2F,3Cl)—O2 | (1-2-7) | 6% |
| 3-HH-4 | (2-1-1) | 12% |
| 5-HH—V | (2-1-1) | 12% |
| 3-HB—O2 | (2-1-2) | 10% |

NI = 69.5° C.; $T_c \leq -20°$ C.; $\Delta n = 0.087$; $\Delta\epsilon = -3.2$; VHR-1 = 99.2%

The composition of Example 21 had a low minimum temperature of $\leq -20°$ C. as compared to Comparative Example 1, and had a large voltage holding ratio.

Example 22

The following composition was prepared, to which 150 ppm of 3,5-di-tert-butyl-4-hydroxytoluene as an antioxidant was added. The characteristic values of the composition were measured by the aforementioned methods.

| | | |
|---|---|---|
| V-HB(2F,3Cl)—O2 | (1-1-1) | 10% |
| 1V-HB(2F,3Cl)—O2 | (1-1-1) | 12% |
| V2-HB(2F,3Cl)—O2 | (1-1-1) | 10% |
| 3-HH—V1 | (2-1-1) | 10% |
| 5-HH—V | (2-1-1) | 26% |
| V—HHB(2F,3Cl)—O2 | (1-2-1) | 8% |
| 1V—HHB(2F,3Cl)—O2 | (1-2-1) | 8% |
| V2—HHB(2F,3Cl)—O2 | (1-2-1) | 8% |
| V—HHB-1 | (2-2-1) | 4% |
| V2—HHB-1 | (2-2-1) | 4% |

NI = 71.2° C.; $T_c \leq -20°$ C.; $\Delta n = 0.080$; $\Delta\epsilon = -2.6$; VHR-1 = 99.3%

The composition of Example 22 had a low minimum temperature of $\leq -20°$ C. as compared to Comparative Example 1, and had a large voltage holding ratio.

What is claimed is:

1. A liquid crystal composition having a negative dielectric anisotropy with an absolute value of 2.0 or more and comprising a first component comprising at least one compound selected from a group of compounds represented by formulas (1-1) and (1-2) and a second component comprising at least one compound selected from a group of compounds represented by formulas (2-1) and (2-2):

(1-1)

(1-2)

(2-1)

(2-2)

wherein, independently in each formula,
$R^1$ is alkyl having 1 to 8 carbons or alkenyl having 2 to 8 carbons;
$R^2$ is alkyl having 1 to 8 carbons or alkoxy having 1 to 7 carbons;
$R^3$ is alkyl having 1 to 8 carbons or alkenyl having 2 to 8 carbons;
$R^4$ is alkyl having 1 to 8 carbons, alkenyl having 2 to 8 carbons or alkoxy having 1 to 7 carbons;
$Z^1$ is a single bond, —$C_2H_4$— or —$CH_2O$—;
$Z^2$ is a single bond, —$C_2H_4$—, —$CH_2O$— or —COO—;
ring $A^1$ and ring $A^2$ are independently 1,4-cyclohexylene or 1,4-phenylene; and
one of $X^1$ and $X^2$ is fluorine, and the other is chlorine.

2. The liquid crystal composition according to claim 1, wherein the first component comprises at least one compound selected from a group of compounds represented by formula (1-1).

3. The liquid crystal composition according to claim 1, wherein the first component comprises at least one compound selected from a group of compounds represented by formula (1-2).

4. The liquid crystal composition according to claim 1, wherein the first component comprises at least one compound selected from a group of compounds represented by formula (1-1) and at least one compound selected from a group of compounds represented by formula (1-2).

5. The liquid crystal composition according to claim 1, wherein
a content ratio of the first component is from approximately 20% to approximately 90% by weight, and
a content ratio of the second component is from approximately 10% to approximately 80% by weight,
based on the total weight of the liquid crystal compounds.

6. A liquid crystal composition having a negative dielectric anisotropy with an absolute value of 2.0 or more and comprising a first component comprising at least one compound selected from a group of compounds represented by formulas (1-1-1) to (1-1-6) and (1-2-1) to (1-2-12) and a second component comprising at least one compound selected from a group of compounds represented by formulas (2-1-1), (2-1-2) and (2-2-1):

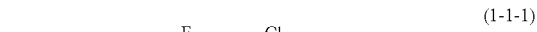
(1-1-1)

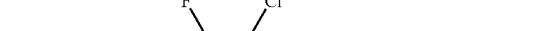

(1-1-2)

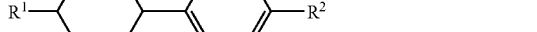

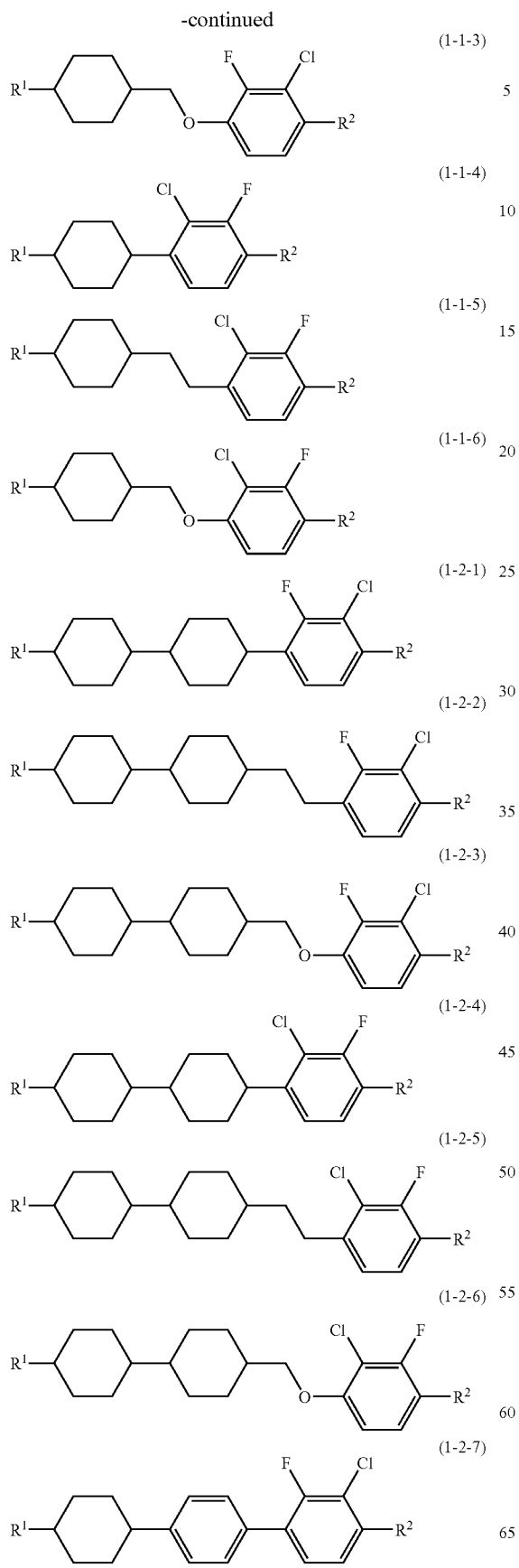

wherein, independently in each formula,
R¹ is alkyl having 1 to 8 carbons or alkenyl having 2 to 8 carbons;
R² is alkyl having 1 to 8 carbons or alkoxy having 1 to 7 carbons;
R³ is alkyl having 1 to 8 carbons or alkenyl having 2 to 8 carbons; and
R⁴ is alkyl having 1 to 8 carbons, alkenyl having 2 to 8 carbons or alkoxy having 1 to 7 carbons.

7. The liquid crystal composition according to claim 6, wherein the first component comprises at least one compound selected from a group of compounds represented by formulas (1-1-1) to (1-1-6).

8. The liquid crystal composition according to claim 6, wherein the first component comprises at least one compound selected from a group of compounds represented by formulas (1-2-1) to (1-2-12).

9. The liquid crystal composition according to claim 6, wherein the first component comprises at least one compound selected from a group of compounds represented by formulas (1-1-1) to (1-1-6) and at least one compound selected from a group of compounds represented by formulas (1-2-1) to (1-2-12).

10. The liquid crystal composition according to claim 6, wherein the first component comprises at least one compound selected from a group of compounds represented by formulas (1-1-1) to (1-1-6) and (1-2-1) to (1-2-6).

11. The liquid crystal composition according to claim 6, wherein the first component comprises at least one compound selected from a group of compounds represented by formulas (1-1-1), (1-1-4), (1-2-1) and (1-2-4).

12. The liquid crystal composition according to claim 6, wherein
   a content ratio of the first component is from approximately 40% to approximately 85% by weight, and
   a content ratio of the second component is from approximately 15% to approximately 60% by weight,
   based on the total weight of the liquid crystal compounds.

13. A liquid crystal composition having a negative dielectric anisotropy with an absolute value of 2.0 or more and comprising a first component comprising at least one compound selected from a group of compounds represented by formulas (1-1) and (1-2), a second component comprising at least one compound selected from a group of compounds represented by formulas (2-1) and (2-2), and a third component comprising at least one compound selected from a group of compounds represented by formulas (3-1) and (3-2):

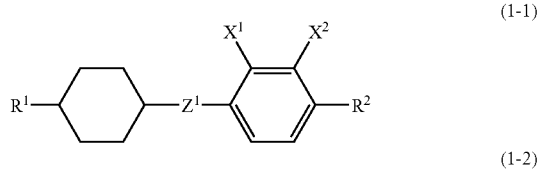
(1-1)

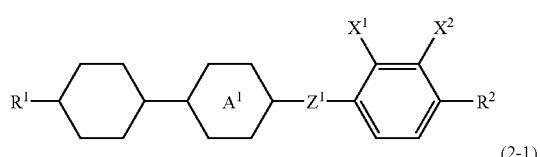
(1-2)

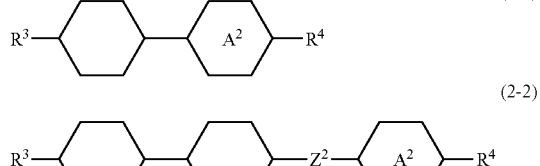
(2-1)

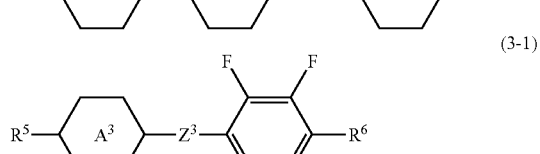
(2-2)

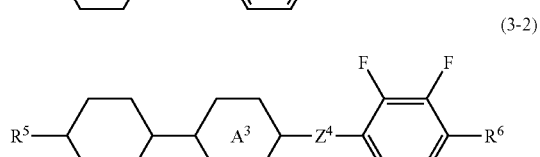
(3-1)

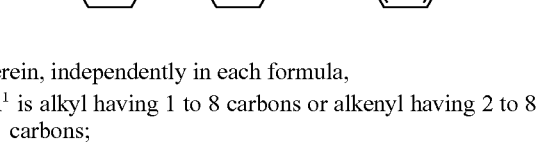
(3-2)

wherein, independently in each formula,
   $R^1$ is alkyl having 1 to 8 carbons or alkenyl having 2 to 8 carbons;
   $R^2$ is alkyl having 1 to 8 carbons or alkoxy having 1 to 7 carbons;
   $R^3$ is alkyl having 1 to 8 carbons or alkenyl having 2 to 8 carbons;
   $R^4$ is alkyl having 1 to 8 carbons, alkenyl having 2 to 8 carbons or alkoxy having 1 to 7 carbons;
   $Z^1$ is a single bond, —$C_2H_4$— or —$CH_2O$—;
   $Z^2$ is a single bond, —$C_2H_4$—, —$CH_2O$— or —COO—;
   ring $A^1$ and ring $A^2$ are independently 1,4-cyclohexylene or 1,4-phenylene;
   one of $X^1$ and $X^2$ is fluorine, and the other is chlorine;
   $R^5$ is alkyl having 1 to 8 carbons or alkenyl having 2 to 8 carbons;
   $R^6$ is alkyl having 1 to 8 carbons or alkoxy having 1 to 7 carbons;
   $Z^3$ is a single bond, —$C_2H_4$—, —$OCF_2$—, —$OCF_2C_2H_4$— or —$C_2H_4COO$—
   $Z^4$ is a single bond, —$C_2H_4$—, —$OCF_2$— or —$OCF_2C_2H_4$—; and
   Ring $A^3$ is 1,4-cyclohexylene or 1,4-phenylene.

14. The liquid crystal composition according to claim 13, wherein the third component comprises at least one compound selected from a group of compounds represented by formulas (3-1-1), (3-2-1) and (3-2-2):

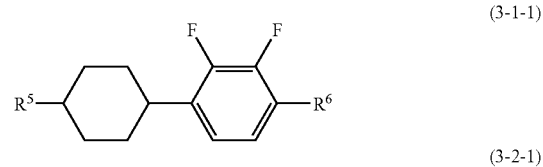
(3-1-1)

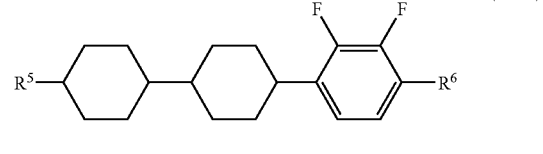
(3-2-1)

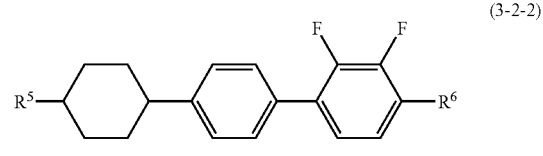
(3-2-2)

$R^5$ is alkyl having 1 to 8 carbons or alkenyl having 2 to 8 carbons; and
$R^6$ is alkyl having 1 to 8 carbons or alkoxy having 1 to 7 carbons.

15. A liquid crystal composition having a negative dielectric anisotropy with an absolute value of 2.0 or more and comprising a first component comprising at least one compound selected from a group of compounds represented by formulas (1-1-1) to (1-1-6) and at least one compound selected from a group of compounds represented by formulas (1-2-1) to (1-2-12), a second component comprising at least one compound selected from a group of compounds represented by formulas (2-1-1), (2-1-2) and (2-2-1), and a third component comprising at least one compound selected from a group of compounds represented by formulas (3-1-1) and (3-2-1):

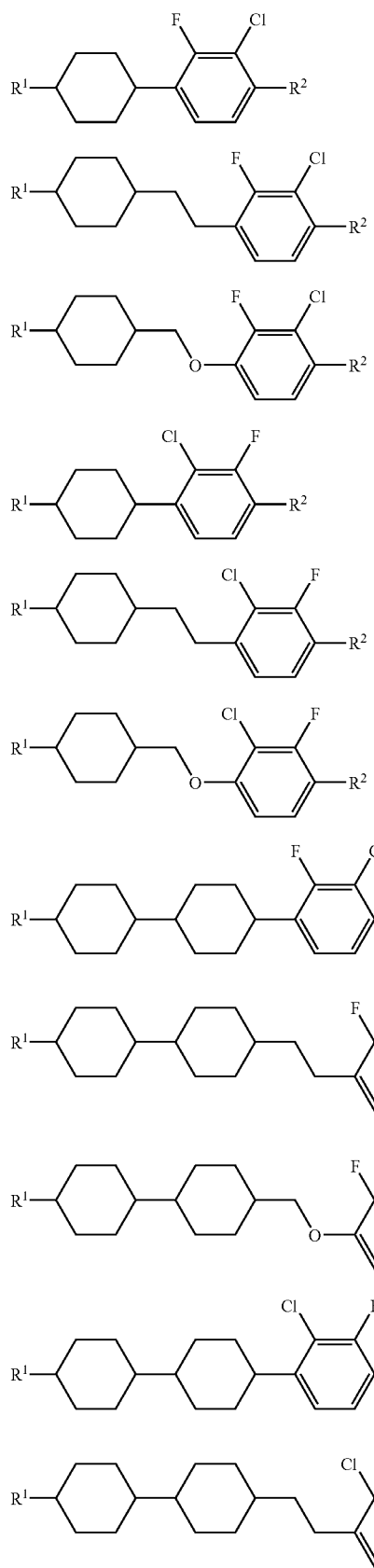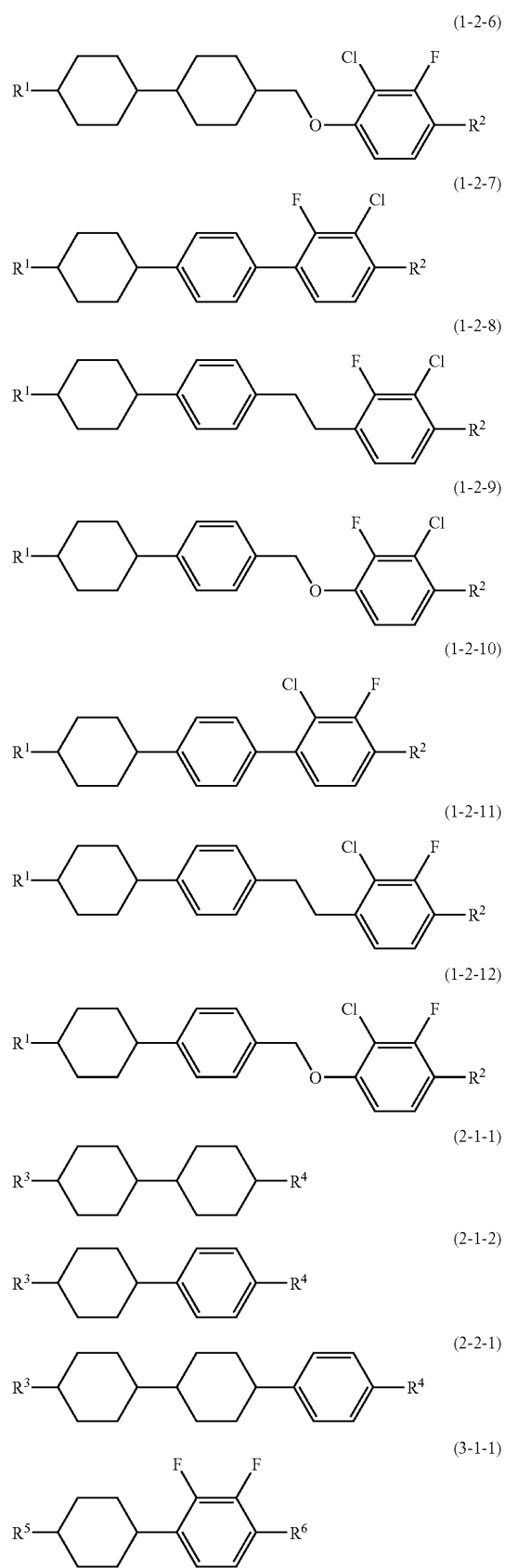

-continued (3-2-1)
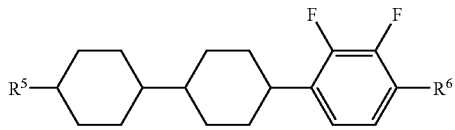

wherein, independently in each formula,
- $R^1$ is alkyl having 1 to 8 carbons or alkenyl having 2 to 8 carbons;
- $R^2$ is alkyl having 1 to 8 carbons or alkoxy having 1 to 7 carbons;
- $R^3$ is alkyl having 1 to 8 carbons or alkenyl having 2 to 8 carbons;
- $R^4$ is alkyl having 1 to 8 carbons, alkenyl having 2 to 8 carbons or alkoxy having 1 to 7 carbons;
- $R^5$ is alkyl having 1 to 8 carbons or alkenyl having 2 to 8 carbons; and
- $R^6$ is alkyl having 1 to 8 carbons or alkoxy having 1 to 7 carbons.

16. A liquid crystal composition having a negative dielectric anisotropy with an absolute value of 2.0 or more and comprising a first component comprising at least one compound selected from a group of compounds represented by formulas (1-1-1) to (1-1-6) and (1-2-1) to (1-2-6), a second component comprising at least one compound selected from a group of compounds represented by formulas (2-1-1), (2-1-2) and (2-2-1), and a third component comprising at least one compound selected from a group of compounds represented by formulas (3-1-1) and (3-2-1):

(1-1-1)
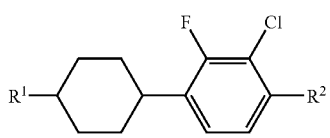

(1-1-2)
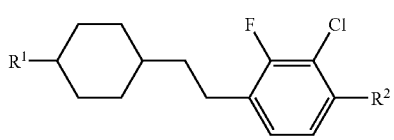

(1-1-3)
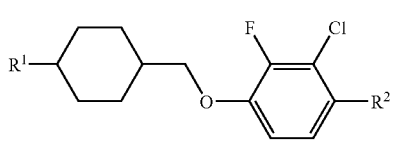

(1-1-4)
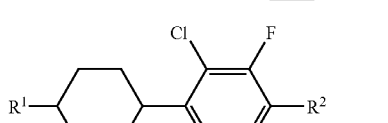

(1-1-5)
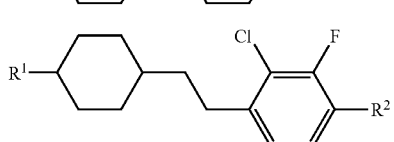

(1-1-6)
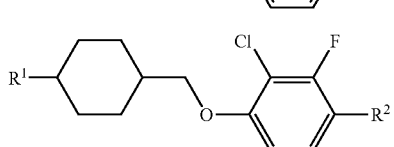

(1-2-1)
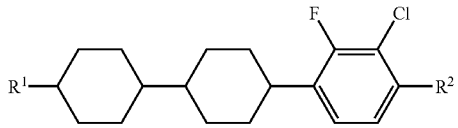

(1-2-2)
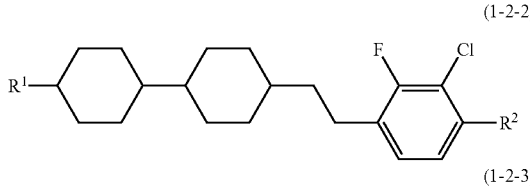

(1-2-3)
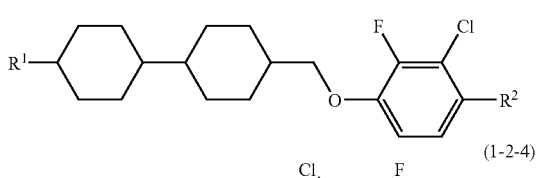

(1-2-4)
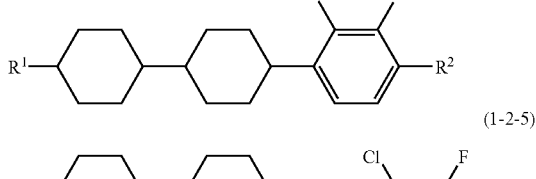

(1-2-5)
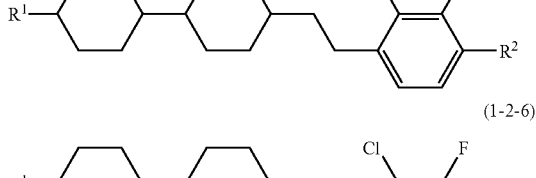

(1-2-6)
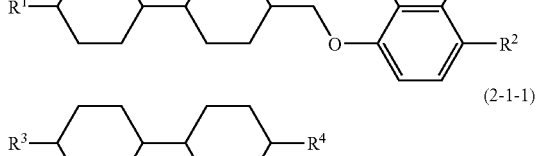

(2-1-1)
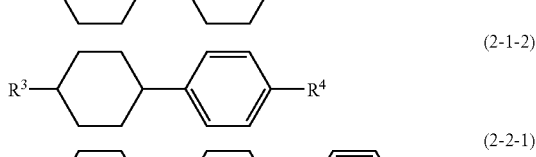

(2-1-2)
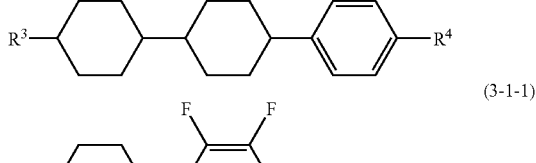

(2-2-1)
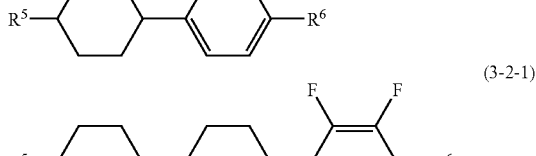

(3-1-1)
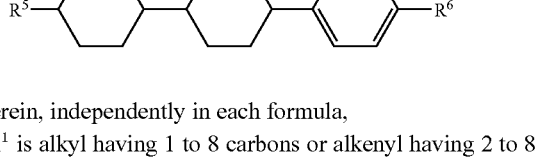

(3-2-1)
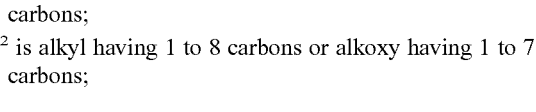

wherein, independently in each formula,
- $R^1$ is alkyl having 1 to 8 carbons or alkenyl having 2 to 8 carbons;
- $R^2$ is alkyl having 1 to 8 carbons or alkoxy having 1 to 7 carbons;

$R^3$ is alkyl having 1 to 8 carbons or alkenyl having 2 to 8 carbons;

$R^4$ is alkyl having 1 to 8 carbons, alkenyl having 2 to 8 carbons or alkoxy having 1 to 7 carbons;

$R^5$ is alkyl having 1 to 8 carbons or alkenyl having 2 to 8 carbons; and $R^6$ is alkyl having 1 to 8 carbons or alkoxy having 1 to 7 carbons.

17. The liquid crystal composition according to claim 13, wherein a content ratio of the first component is from approximately 30% to approximately 70% by weight, a content ratio of the second component is from approximately 10% to approximately 50% by weight, and a content ratio of the third component is from approximately 20% to approximately 60% by weight, based on the total weight of the liquid crystal compounds.

18. The liquid crystal composition according to claim 1, wherein the liquid crystal composition has a dielectric anisotropy of from −2.0 to approximately −5.0.

19. A liquid crystal display device comprising the liquid crystal composition according to claim 1.

20. The liquid crystal composition according to claim 13, wherein the liquid crystal composition has a dielectric anisotropy of from −2.0 to approximately −5.0.

21. A liquid crystal display device comprising the liquid crystal composition according to claim 13.

* * * * *